US008814471B2

(12) United States Patent  
Farone et al.

(10) Patent No.: US 8,814,471 B2  
(45) Date of Patent: Aug. 26, 2014

(54) METHOD AND SYSTEM FOR CAPTURING SUBSURFACE CONTAMINANTS

(75) Inventors: William A. Farone, Irvine, CA (US); Benjamin V. Mork, Newport Beach, CA (US); Tracy Palmer, Temecula, CA (US); Scott B. Wilson, Leucadia, CA (US)

(73) Assignee: Regenesis Bioremediation Products, San Clemente, CA (US)

( * ) Notice: Subject to any disclaimer, the term of this patent is extended or adjusted under 35 U.S.C. 154(b) by 606 days.

(21) Appl. No.: 12/939,350

(22) Filed: Nov. 4, 2010

(65) Prior Publication Data

US 2011/0274497 A1 Nov. 10, 2011

Related U.S. Application Data

(60) Provisional application No. 61/258,317, filed on Nov. 5, 2009.

(51) Int. Cl.
   *B09C 1/00* (2006.01)
   *B09C 1/08* (2006.01)

(52) U.S. Cl.
   CPC .. *B09C 1/08* (2013.01); *B09C 1/002* (2013.01)
   USPC .................................. 405/128.15; 405/128.5

(58) Field of Classification Search
   USPC ......................................... 405/128.15, 128.5
   See application file for complete search history.

(56) References Cited

U.S. PATENT DOCUMENTS

| | | | | |
|---|---|---|---|---|
| 2,838,466 A | * | 6/1958 | Padbury et al. | 405/264 |
| 3,286,475 A | * | 11/1966 | Adams | 405/264 |
| 4,156,658 A | * | 5/1979 | Mercer et al. | 405/128.5 |
| 5,700,107 A | * | 12/1997 | Newton | 405/128.75 |
| 6,336,772 B1 | * | 1/2002 | Yamashita | 405/128.5 |
| 6,416,252 B1 | * | 7/2002 | Moore | 405/129.45 |
| 6,592,294 B1 | * | 7/2003 | Moore | 405/129.25 |
| 7,160,471 B2 | * | 1/2007 | Looney et al. | 405/128.5 |
| 7,395,863 B2 | * | 7/2008 | Wang et al. | 166/307 |

\* cited by examiner

*Primary Examiner* — John Kreck
(74) *Attorney, Agent, or Firm* — Stetina Brunda Garred & Brucker

(57) ABSTRACT

Compositions and methods of using such compositions for treating subsurface soil in an aquifer to remove contaminants that may be present in water of the aquifer. The composition includes a first solution and a second solution. The first solution includes at least one chemical capable of being effectively bound to soil to form a sorbent matrix by reacting in the subsurface. The second solution includes at least one chemical capable of reacting with at least one of the chemicals in the first solution in order to create the matrix. The first and second solutions are chosen so as to react on a time scale allowing at least one chemical in the first solution to bind to the soil.

55 Claims, 25 Drawing Sheets

METHOD AND SYSTEM FOR CAPTURING SUBSURFACE CONTAMINANTS

STATEMENT RE: FEDERALLY SPONSORED RESEARCH/DEVELOPMENT

The present application claims benefit of U.S. Provisional Patent Application Ser. No. 61/258,317 entitled SUBSURFACE CONTAMINATE CAPTURE COMPOSITION filed Nov. 5, 2009; all of the teachings of which are included herein by reference.

CROSS-REFERENCE TO RELATED APPLICATIONS

Not Applicable

BACKGROUND

The present invention relates to systems and methods for systematically effectuating remedial changes to soil and ground water passing therethrough, and more particularly systems and methods that can facilitate the removal and/or transformation of contaminants via targeted ground water migration.

Numerous prior art attempts have been made to facilitate the removal of contaminants from soil. In this regard, the contamination of soils is well-documented and becoming an ever-increasing problem as spills, the dumping of toxic waste, leakage from underground storage tanks and the like continue to occur in increasing frequency, especially with respect to volatile organic contaminants. As a consequence, serious threats to health and wildlife are created as the contaminants introduced into the environment are retained by the subsurface soil and further, can descend hydrodynamically into the ground water.

Several approaches have been developed to facilitate the removal of contaminants. Such approaches have included in situ vapor extraction methods, combustion processes for vaporizing and/or thermally destroying contaminants, electrokinetic soil decontamination (e.g., electroosmosis or electromigration wherein the use of an electric field is applied to selectively attract of facilitate the transport of select contaminants), and—perhaps the most drastic and expensive approach—excavation, isolation and treatment of contaminated soil.

Another approach for removing contaminants from soil have taken the form of super absorbent polymers, either in solid or liquid form, that are capable of being sprayed, pumped or injected in situ wherein the polymer is operative to form a complex with the contaminant and thereafter removed and/or destroyed. Exemplary polymers utilized in such applications include polyethylenes, polypropylenes, polyacrylonitrile, polyesters, alkenyl aromatic resins, silicone polyimides, polyurethanes, natural rubber and synthetic rubber, such as silicone rubbers. Biological approaches to removing contaminants typically involve biodegradation that deploy a population of micro-organisms capable of degrading a specific contaminant sought to be removed.

Still further, biological approaches to removing contaminants have been developed that typically involve biodegradation whereby a population of microorganisms capable of degrading a specific contaminant is deployed in situ. In most cases these organisms are native to the soil and somewhat acclimated to the contaminant. In these cases remediation is facilitated by addition of the proper nutrients to allow these organisms to perform the degradation more rapidly. This is sometimes referred to as enhanced natural attenuation. When organisms are not available in a minority of cases bioaugmentation can be used where organisms are added.

With respect to treating contaminants in the soil subsurface, particularly in subsurface waters, such methods generally fall into four main categories. These are biochemical oxidation, biochemical reduction, chemical oxidation and chemical reduction. The first two of these are collectively called bioremediation when referring to the removal of contaminants using native or augmented microorganisms.

There have been a wide variety of materials and methods used for the bioremediation of contaminants. In many cases materials are injected into the subsurface to facilitate the degradation of the contaminants by providing nutrients and a carbon source for the microorganisms to use in the biodegradation sequence. Lactates, lactate polymers, carbohydrates and oils are among a few of the materials that have been used. In some of the cases the materials are designed to release the carbon source or nutrients over long periods of time to allow the bacteria time to degrade the contaminants and to provide the necessary chemical energy for the bacteria to continue to remediate the contaminants long after the injection as more contaminants flow into the treatment zone. Sometimes these long lasting carbon and nutrient sources are referred to as "barriers' since they reduce the amount of contaminants that move past the point where the carbon compounds and nutrients are being released. This is not a barrier in the sense of collecting or stopping the movement of the contaminant since the contaminant simply ceases to exist if it is degraded. Unfortunately such barriers rarely have enough microbial activity to remove the contaminant to acceptable levels during the flow through the treatment zone.

In another form of treatment, a physical barrier can be erected such as a "wall." Exemplary of such form of treatment includes the teachings of U.S. Pat. No. 5,608,137 which teaches a method of containing and remediating contaminants within soil via the steps of placing a gel barrier into the soil for containing the contaminants therein to thus create a containment zone, and thereafter adding microorganisms capable of remediating the contaminants in the soil to the containment zone. This technique, however, is very expensive and adequate containment is difficult to attain. The main idea is that the contaminant flow trapped behind the wall has time to be degraded by the microorganisms before it finds its way around the wall; however, this process is flawed as there is no concentration of the contaminant behind the wall since the water and contaminant are contained together.

There is also a third mode of in situ treatment where solid particles, such as activated carbon, are injected to help slow down the contaminant flow by adsorption on the carbon. The carbon may be also impregnated with bacteria and nutrients to facilitate the reduction of the adsorbed contaminants. A chemical variant on this method is to use emulsions that may provide a carbon source and nutrients to scavenge some of the contaminants and help contain them for future microbial treatment.

Generally speaking, in most of these methods the treatment is chasing the contaminant. In metal wall barriers there is an issue of expense and the purity of the metal required insofar as no metals other than allowable metals, (e.g., iron) are emitted into the ground water as the barrier reacts in water. Along these lines, most iron and especially steels are relatively high in metals that are regulated in ground water.

In the addition of particles such as activated carbon or emulsions the size of the structures are 1,000 times or more greater than the contaminants they are chasing or trying to absorb. The injected particles are trying to fit through pore structures in the subsurface soil that are better traversed and penetrated by the smaller contaminants. For the most part the only effective part of the systems is the carbon sources and sometimes the nutrients that are released as molecules into the subsurface water.

As a consequence, the treatment sought to be deployed in order to eradicate the contaminants is never optimally realized. In this regard, the desired treatments sought to be deployed essentially never "catches up" with the target contaminants and/or the contaminants are not sufficiently contained to a degree that allows for the desired chemical or biodegradation reaction to be optimally realized. Accordingly, there is a substantial need in the art for treating contaminants in soil and subsurface waters that is operative to effectively and efficiently facilitate the removal and/or transformation of contaminants that is easier to deploy, more cost effective and operative to react with the target contaminants to a much higher degree than prior art methods and techniques. There is likewise a need in the art for such methodology that can be tailored to facilitate the removal of a specific type or types of contaminants based upon the unique characteristics of the specific geographical area within which the contaminants are contained. There is still further a need in the art for such contaminant-removal technology that can be systematically deployed to be fluid in nature to thus enable the contaminants to undergo a desired remedial chemical reaction to a degree much greater than prior art methods and techniques.

BRIEF SUMMARY

The present invention provides compositions and methods for treating subsurface soil in an aquifer to increase the sorption of contaminants that may be present in water of the aquifer.

One composition envisioned by the present invention includes a first solution and a second solution. The first solution includes at least one chemical capable of being effectively bound to soil to form a sorbent matrix by reacting in the subsurface. Whereas, the second solution includes at least one chemical capable of reacting with at least one of the chemicals in the first solution in order to create the matrix. Furthermore, the first and second solutions are chosen so as to react on a time scale allowing at least one chemical in the first solution to bind to the soil.

Generically, the first solution may contain a monomeric compound that can be cross-linked and polymerized in-situ or a polymeric compound that can be cross-linked and further polymerized in-situ such as a polysaccharide, a protein or a polyester having at least two free carboxyl groups to be cross-linked on a polyol. Examples of the first solution include, but are not limited to carrageenan, gelatin, agar, adipic acid, succinic acid, sucrose reacted with one or more difunctional carboxylic acids (e.g., succinic acid to make sucrose disuccinate), and glycerin (or other polyol) reacted with a difunctional carboxylic acid (e.g., adipic acid). Alternatively, the first solution may contain a tetraalkyl orthosilicate crosslinked with an acid or base. Furthermore, it is contemplated that the first solution can be made up of a combination of the various monomeric compounds. Generically, the second solution may contain cross-linking agents such as multivalent cations that are capable of reacting with the compounds present in the first solution. Examples of the second solution include, but are not limited to, compounds containing divalent cations (e.g, calcium, magnesium) and trivalent cations (e.g., aluminum, iron). In particular, it envisioned that certain processes described herein may be conducted without the addition of a second solution when multivalent cross-linking agents are present in the soil or groundwater (e.g., using the calcium present in the groundwater to be purified). The requirement for cross-linking is that the binding energy between the cross-linking cation and the material of the first solution must be greater than the binding energy between the cross-linking cation and any other ligand in the solution. The anion associated with the cross-linking cation may be any soluble species such as chloride, lactate, acetate, nitrate, etc. Additionally, one or both of the solutions can include at least one additive to enhance the sorption of contaminants or to enhance microbial activity or to enhance chemical reactivity. One particular embodiment of the present invention includes sorbitol esters, sorbitan esters, a glycerol monoester, or an amino acid containing a sulfhydryl group as the additive. Cysteine and cysteine derivatives are useful in making such esters or used alone. Another embodiment of the present invention includes at least one oxygen releasing compound as the additive. Examples of suitable oxygen releasing compounds include particular peroxide compounds disclosed in U.S. Pat. Nos. 5,395,419 and 5,264,018, the entire disclosures of which are herein incorporated by reference. Further additives that may be utilized by the present invention to enhance aerobic and anaerobic microbial activity include, but are not limited to, nitrates, lactic acid, and salts thereof.

In one embodiment, the first solution is 3.0% iota carrageenan, the second solution is 0.045% calcium chloride and 0.005% ferrous sulfate, and the first and second solutions are diluted with water such that the composition has a concentration of 0.03% to 0.15%. Although carrageenan in any of the kappa, lambda, or iota forms can be used, it has been found that the iota form is the most soluble and readily usable. In another embodiment, the first solution is 3.0% gelatin, the second solution is 0.045% calcium chloride and 0.005% ferrous sulfate, and the first and second solutions are diluted with water such that the composition has a concentration of 0.15% to 0.3%. In another embodiment, the first solution is 3.0% succinic acid, the second solution is 0.045% calcium chloride and 0.005% ferrous sulfate, and the first and second solutions are diluted with water such that the composition has a concentration of 0.15% to 0.3%. In another embodiment, the first solution is 3.0% adipic acid, the second solution is 0.045% calcium chloride and 0.005% ferrous sulfate, and the first and second solutions are diluted with water such that the composition has a concentration of 0.15% to 0.3%. In another embodiment, the first solution is 3.0% sucrose disuccinate, the second solution is 0.045% calcium chloride and 0.005% ferrous sulfate, and the first and second solutions are diluted with water such that the composition has a concentration of 0.15% to 0.3%. In place of the calcium chloride, other calcium salts may be substituted with beneficial results. For example, calcium lactate may be substituted, which may assist in anaerobic remediation. Additionally, the ferrous sulfate is optional and may be omitted if so desired. Furthermore, it has been observed that diluting the two solutions such that the composition has a concentration of 0.1% is preferred in certain experimental conditions.

Additionally, the present invention envisions methods of removing contaminants from subsurface soil in an aquifer or removing them from the water in contact with the soil. In cases where the contaminant and soil are in equilibrium the method causes contaminants to preferentially be held in the materials of this invention when they normally would desorb back into the water. In cases where the soil and contaminant have not yet reached equilibrium the contaminant would be preferentially held in the materials of this invention. One particular method includes the steps of providing a first solution, providing a second solution, mixing the two solutions, and injecting the resulting composition into the subsurface. The first solution includes an environmentally acceptable chemical capable of being effectively bound to soil to form a sorbent matrix by reacting in the subsurface. The second solution includes an environmentally acceptable chemical capable of reacting with one or more chemicals in the first solution to create the matrix. Next, the first solution and the second solution are mixed in a quantity that amounts to a liquid volume having a sufficient concentration capable of effectively removing the contaminants present in at least one pore volume of the soil and included water volume to be treated. In particular, based upon the amount of contaminants present in the soil, one skilled in the art can determine how much of the two solutions are necessary to remove a sufficient amount of contaminants. The two solutions can be prepared at a standard concentration and then diluted with water to achieve the necessary administration amount at the site. Finally, the resulting composition is injected into the subsurface such that the chemicals in the first and second solutions react on a time scale allowing the chemicals in the first solution to coat and bind to the soil. Alternatively, or additionally, the first solution and second solution can be injected individually into the subsurface thereby allowing the two solutions to mix after injection rather than before injection. For example, the kappa and lambda forms of carrageenan are not as soluble as the iota form, and if such forms are used they may be better suited to the process wherein the first and second solutions are injected individually. Another embodiment envisions a process wherein the second solution is already present in the subsurface, rather than being injected. For example, the cross-linking of the first solution to form the matrix can be facilitated by naturally present calcium located in the subsurface to be treated. The necessary concentration of the second solution to cross-link the first solution may be achieved by the use of an indigenous second solution, the injection of a second solution, or a combination of both.

Furthermore, various injection patterns and schedules are contemplated by the present invention. For example, when the aquifer flow is minimal or nonexistent, one could inject the solutions at multiple locations over the area to be treated thereby creating a grid pattern to form the matrix rather than merely relying on the aquifer flow to fully distribute the two solutions throughout the desired treatment area. Additionally, since one goal of the present invention is to maximize the surface area of the matrix, several smaller injections over time may be better suited to building the cross-linked matrix layer instead of a single large injection. In this situation, smaller doses of the two solutions may be injected more than once. Even if the total administered solution amounts were the same in a single injection versus multiple injections, the matrix building capability may be improved via the administration of numerous smaller injections.

In this method, one or both of the solutions may include at least one additive to enhance the sorption of contaminants or to enhance microbial activity. In particular, the additive may be sorbitol, sorbitan, or a glycerol monoester. In one embodiment of the method, the first solution is 3.0% carrageenan, the second solution is 0.045% calcium chloride and 0.005% ferrous sulfate, and the first and second solutions are diluted with water such that the composition has a concentration of 0.03% to 0.15%. In another embodiment of this method, the first solution is 3.0% gelatin, the second solution is 0.045% calcium chloride and 0.005% ferrous sulfate, and the first and second solutions are diluted with water such that the composition has a concentration of 0.15% to 0.3%.

Some of the contaminants may adsorb onto the soil as water flows through the pores and some of the contaminants may absorb into hummic and lignocellulosic materials in the soil, as well as silicates and other inorganic structures that may be present. The compositions and methods of the present invention are intended to extend and increase the porosity of the soil surfaces in an effort to capture and hold contaminants much more efficiently and readily than the soil itself. By using the vast surface area of the soil and providing a porous sorbent extended surface, the contaminants remain in an intended treatment zone and are available for microbial degradation over an extended period of time. The degrading bacteria, many of which are sessile and colonize the soil, are then able to degrade the contaminants in the treatment zone. The compositions and methods of the present invention may also serve to make the treatment zone more conducive to microbial growth and degradation of the contaminants than would otherwise occur.

Compositions envisioned by the present invention will react in water to bind to the soil surface. Further, the compositions should be capable of supporting microbial life, sorbing the contaminants, and flowing though the pore structure of the soil as they react with the soil. In a preferred embodiment, the degree of reaction can be controlled to allow as much or little of the water through the pore spaces as desired for a specific application. The matrix that is formed should be porous to the contaminated solution to allow the contaminant to be sorbed. The compositions and methods of the present invention should result, therefore, in both the reduction of the mass flux of contaminants as well as the concentration of contaminants.

Preferred compositions are non-toxic, provide little harm to the environment, are relatively inexpensive, and are capable of being mixed or diluted for injection on a contaminated site using readily available equipment, such as that already in use for the currently marketed carbon sources.

The compositions of the present invention are currently envisioned as comprising two prepared solutions to form a contaminant capture material (CCM). Solutions are desirable since they allow the compounds to be in as close to monomolecular form as possible, thereby allowing them extended travel in the soil. The first solution comprises a sorbent compound capable of reacting with and adhering to the soil. The second solution comprises a compound capable of cross-linking with the first solution to form a matrix. Within this matrix exists internal "cages" produced by the bonds of the CCM. These cages are able to physically trap the contaminants in the internal portion, rather than the contaminants merely physically adsorping to the material as occurs in the prior art. By trapping the contaminants within the internal cages of the CCM, the contaminants are contained for a longer period of time than is taught by the prior art, thereby allowing the contaminants sufficient time for bioremediation to occur without leaking back out into the subsurface. Accordingly, the CCMs of the present invention should create cages that are large enough to contain the intended contaminant molecules with an increased binding energy compared to physical adsorption alone. Based on the results presented herein, and the dimensional sized presented in Tables 1 and 2, it appears that for optimal results the cage size is at least double in volume of the contaminant and has linear dimensions at least 25% greater than the contaminant molecule.

TABLE 1

Physical Molecular Sizes of Example Contaminants

| Contaminant | Typical Volume ($Å^3$) | Typical Distance (Å) |
| --- | --- | --- |
| Vinyl chloride | 61 | 3.7 |
| Transdichloroethylene | 75 | 4.3 |
| Trichloroethylene | 89 | 4.3 |

TABLE 1-continued

Physical Molecular Sizes of Example Contaminants

| Contaminant | Typical Volume (Å$^3$) | Typical Distance (Å) |
| --- | --- | --- |
| Trichloroethane | 94 | 3.4 |
| Benzene | 99 | 5.0 |
| Tetrachloroethylene | 102 | 4.3 |
| Toluene | 118 | 5.9 |
| Meta xylene | 135 | 6.7 |
| Para xylene | 136 | 7.0 |
| Ethylbenzene | 136 | 7.2 |

Table 1 lists various typical aquifer contaminants and their volume and dimensional sizes. The present invention is not limited to such listed contaminants, but rather they are exemplary and can be used to deduce the size of similar contaminants based on elemental composition. For example, phenol is about the same size as toluene and catechol is about the same size as xylene.

TABLE 2

Physical Molecular Sizes of Example CCMs

| Capture Structure | Typical Internal Cage Volume (Å$^3$) | Typical Internal Cage Distance (Å) |
| --- | --- | --- |
| Iota carrageenan with Ca$^{+2}$ | 730 | 12 |
| Dicalciumdiadipate | 307 | 10 |
| Tricalciumtrisuccinate | 350 | 11 |
| Gelatin | ~>700 | ~>10 |
| Agar | ~>700 | ~>10 |
| Dicalciumdisucrosesuccinate | 955 | 16 |
| Dicalciumdisuccinate | 233 | 7 |

As can be seen, Table 1 lists the external dimensions of typical contaminants and Table 2 lists the internal dimensions of exemplary CCMs. For example, the cage considered for iota carrageenan is from two adjacent dimer sections of the polymer cross-linked with Ca$^{+2}$ across two sulfate links along the structure. Many such cages will exist within carrageenan. The sizes of gelatin and agar are estimates based on their variability. Agar is similar to carrageenan in that it is a galactose polymer. It is linked in a different manner and has various other substituents along its sides other than sulfate, and also has less sulfate. Based on this structure, however, its cages will be at least as large as carrageenan. Further, gelatin will have cages of various sizes. Proteins like gelatin have side chains that may bind to make the gel that have functional groups every third or fourth amino acid along the protein chain. As such, gelatin's cages will also be of the same approximate size as carrageenan's. Under this understanding, the cages must be large enough to accommodate the intended contaminants. For example, dicalciumdisuccinate creates a cage that is not large enough to contain larger contaminants, but if you increase the cage size to tricalciumtrisuccinate the cage size is sufficient. Accordingly, prior art compounds, such as polyvinyl alcohol, methyl and ethyl cellulose, and polyvinyl acetate, will adsorb on soil but do not create cages as disclosed herein and thus do not have the same benefits.

Either solution may carry adjuvants to enhance the structure of the matrix, to enhance microbial activity, or to enhance contaminant sorption. One example of potential adjuvants to add are neutral (nonionic) low Hydrophilic-Lipophilic Balance (HLB) surfactants, for example, sorbitol, sorbitan, and glycerol monoesters. These surfactants are believed to interfere with the cross-linking, thereby keeping the CCM in suspension for a longer period of time. Furthermore, these surfactants are environmentally friendly and their addition poses little to no risk.

BRIEF DESCRIPTION OF THE DRAWINGS

These and other features and advantages of the various embodiments disclosed herein will be better understood with respect to the following description and drawings, and in which.

DETAILED DESCRIPTION

Figure 1:
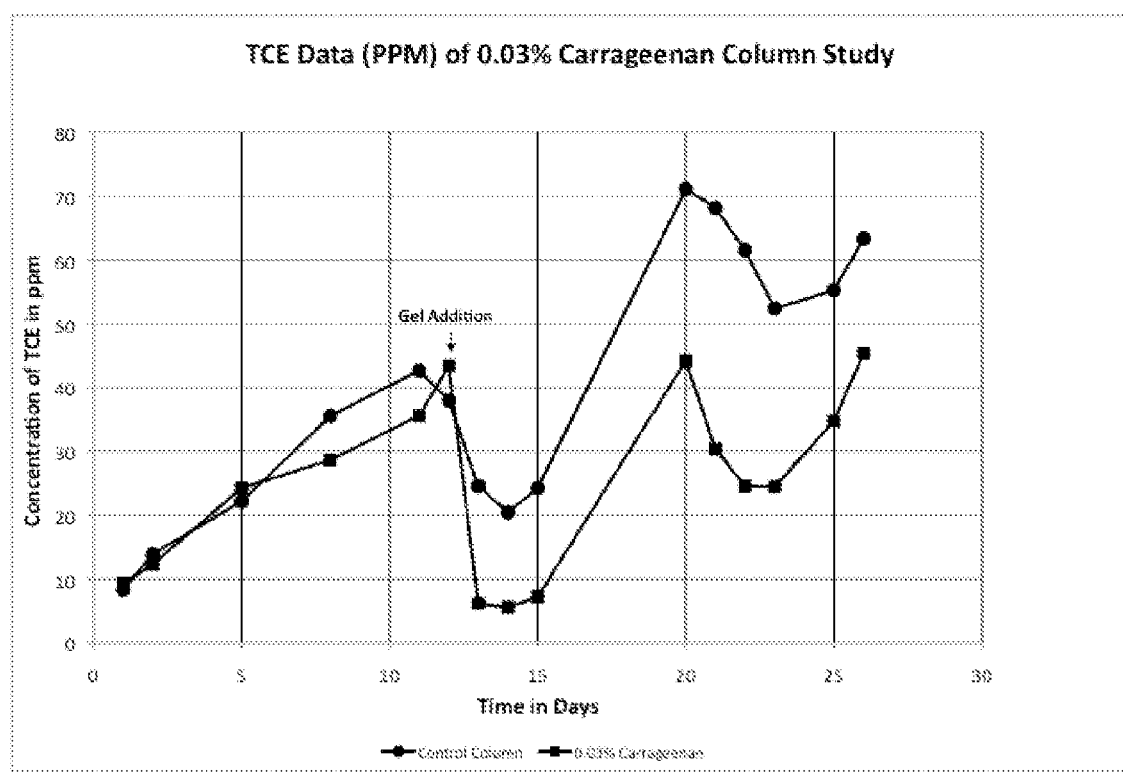
FIG. 1 shows the reduction of TCE concentration in a carrageenan column of a first embodiment.

The detailed description set forth below is intended as a description of the presently preferred embodiments of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention. In particular, the following column experiments were carried out to simulate the application and resulting effects of the present invention.

COLUMN EXPERIMENT 1

Summary of Column Experiment 1:

The first solution contains a pre-dissolved amount of carrageenan. As made in this embodiment, which is capable of being transported to a contaminated site, the first solution is about 3% by weight of carrageenan. The second solution contains a solution of calcium chloride with some added ferrous salt. In this embodiment, the second solution is about 0.045% by weight of calcium chloride and 0.005% of the ferrous salt. These solutions are mixed immediately before injection with water to be used in injecting the mixture. Dilution with this water is made until the carrageenan comprises 0.03% to 0.3% of the injection water. Enough solution is injected to be equal to one pore volume of the zone to be treated. This mixture reacts over 2-3 days in the subsurface reducing both the contaminant concentration and the contaminant mass flux. Laboratory data from soil in columns shows that levels as low as 0.03% can reduce the contaminant concentration of TCE, toluene and octane by as much as 80%.

Methods of Column Experiment 1:

Two identical glass columns that are three feet tall with a 2 inch diameter were set up on a column stand. A small amount of glass wool was added to the bottom of each column to prevent the column media from flowing out the bottom valve of the columns. Each column was packed with 1000 grams of ASTM Silt and Sand. The 1000 grams soil mixture contained 750 grams of ASTM Reference Soil ML-1 Silt and 250 grams of ASTM Reference Soil SP Sand. The soils were thoroughly mixed before adding to the columns.

The columns were equilibrated for 12 days with a mixture of octane, TCE and toluene. The solutions were added at approximately 100 mg/l each. The solutions were made up to be analytically 100 mg/l of each but due to evaporative losses this does not mean that the solutions were at that level. TCE and toluene are soluble at that level but they will still have losses due to the equilibrium with the top of the open column. Octane is free phase and is expected to act quite differently.

The contaminants were measure by Gas Chromatography (GC). The GC is an SRI GC with an FID and ECD detector, (Flame Ionization Detector and Electron Capture Detector). The column is a Restek, MXT-1, 60 m×0.53 mm×5 um. The carrier gas and makeup gas are nitrogen and set at 20 psi. Helium gas is set at 4 psi, air at 6 psi, and hydrogen at 24 psi. The temperature profile is set at 60 C and held constant for four minutes and then ramps at 10 degrees per minute until 180 C and held at 180 C for another 20 minutes.

The GC was calibrated by serial dilutions of TCE and Toluene. The TCE was prepared by adding 0.10 grams of TCE into a 1 liter volumetric flask and diluting to the 1 liter mark with distilled water. The solution is covered and mixed to completely dissolve the TCE. Six serial dilutions were completed to calibrate the GC for TCE. The toluene was prepared in the same manner as the TCE. The samples are injected into the GC by injecting 1 micro-liter of the liquid directly into the GC. Calibration curves were produced for both TCE and Toluene. TCE is calibrated on the FID detector as well as the ECD detector, while Toluene is calibrated on the FID detector. The octane peak has been identified on the GC with the FID and lower levels are calibrated in methanol to insure uniform dispersion.

After the two columns were equilibrated for 12 days, a carrageenan gel mixture was added to column 2, while column 1 became the control column. The gel was prepared by dissolving 3 grams of iota carrageenan in 97 grams of water. This first solution is stirred and heated until the carrageenan is dissolved. The mixture is cooled and a gel forms. While the gel was forming a separate second solution containing 0.45 grams of calcium chloride and 0.05 grams of ferric chloride in one liter of water was prepared. The second solution was mixed until the salts dissolved, which resulted in a 0.045% calcium chloride solution and 0.005% ferric chloride. Three grams of the 3% carrageenan gel first solution was mixed with 300 ml of the second salt solution. The resulting gel solution contained 0.03% carrageenan. The gel mixture was added on top of column 2 and 300 ml of water was added on top of column 1. After the gel had completely dispersed through the column (about 24 hours) contaminant solution was added on a daily basis to each column. On sampling days, the columns were kept loaded with contaminant solution during the entire experiment. At each sampling interval a sample was taken from the bottom of each column and analyzed as described above on the GC.

Figure 2:
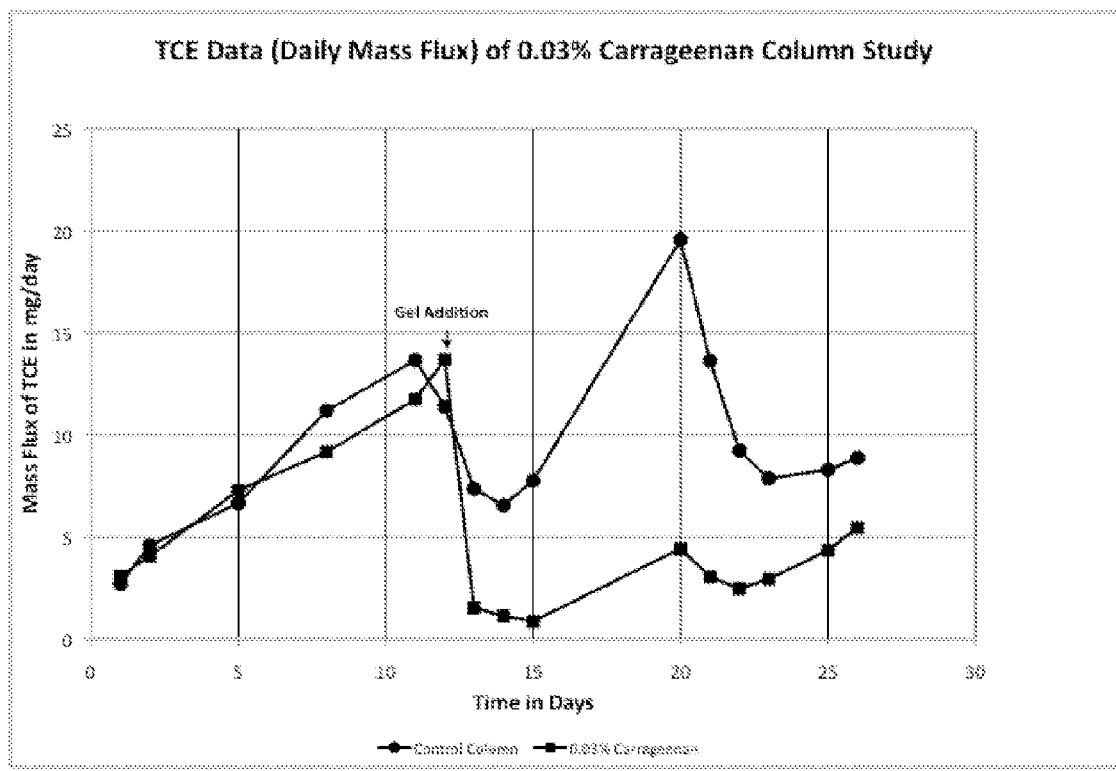
FIG. 2 shows the reduction of TCE mass flux in a carrageenan column of a first embodiment.
Figure 3:
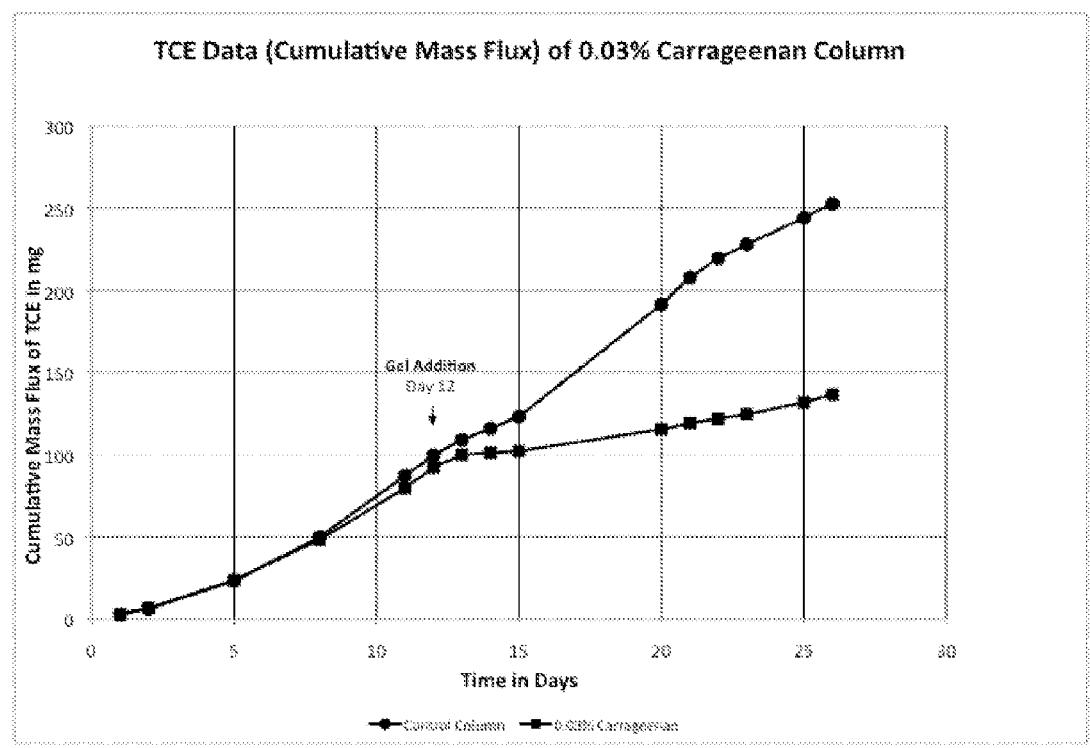
FIG. 3. shows the reduction of TCE cumulative mass flux in a carrageenan column of a first embodiment.

Results of Column Experiment 1:

FIG. 1 shows the reduction of TCE concentration from the experimental column versus the control method. As can be seen there is a notable difference between the columns after the addition of the carrageenan solution. FIG. 2 shows the results of the same columns in regard to TCE, taking into account the mass flux. The volumetric flows for the days in which data was taken is multiplied by the concentration on those days to arrive at an amount that was coming through the soil column on that day. FIG. 3 shows the cumulative mass flux of TCE. After the composition is added there is a lag time where it has to flow through the soil and for the cross-linking to take place. Then the difference is very obvious.

Figure 4:
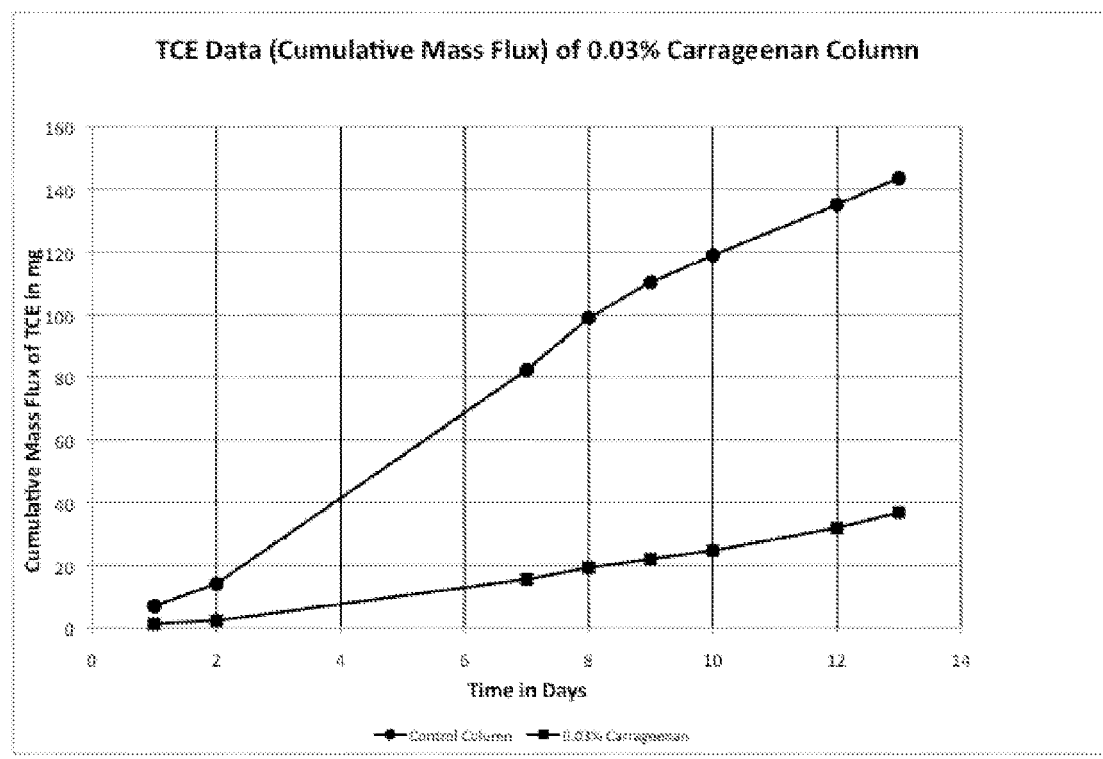
FIG. 4 shows the reduction of TCE cumulative mass flux of FIG. 3 with the time period prior to the solution addition removed.

FIG. 4 shows the data of FIG. 3 starting at the point of composition addition to the experimental column. From this figure, it can be seen that there is a reduction of 71.1% in the TCE that came out of the column after the gel was applied before it saturated. The reduction is about 101.5 mg of TCE. Since the pore volume was 330 ml the amount of carrageenan used was 99 mg. Thus the sorption of the TCE is approximately 102% of the weight of carrageenan under the conditions of this experiment. Notably, toluene and octane were also present in the experiment and the sorption of the compounds is not likely to be independent. One expects that if the experiment were done with only TCE the amount sorbed would be higher.

On the 27$^{th}$ day and thereafter the concentrations coming though the column were equal. The explanation is that the sorption sites had saturated at that point. Therefore, if the carrageenan were deployed at a site where there was more than 23% of the weight of carrageenan used, the rate of bioremediation would have to make up the difference if the treatment were to totally stop the plume.

With first solution amounts of 0.3% (ten times more than used here), the mass flux is dramatically reduced but the concentrations are not. The optimum concentration for sorption may be between these values.

Figure 5:
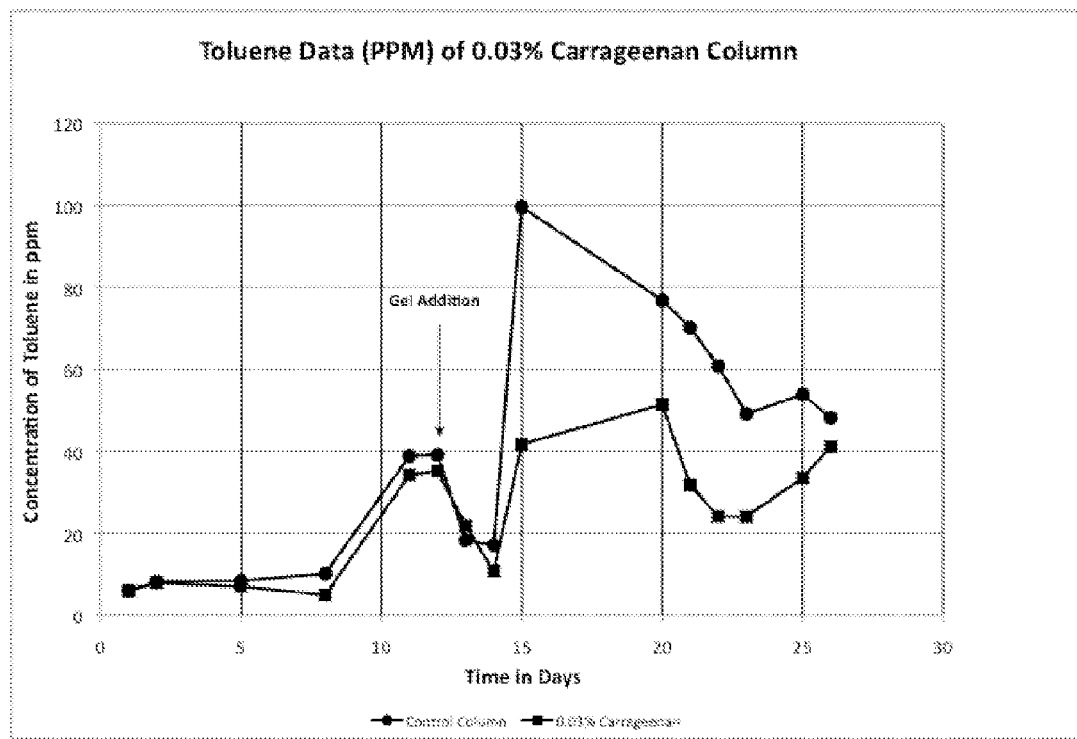
FIG. 5 shows the reduction of toluene concentration in a carrageenan column of a first embodiment.
Figure 6:
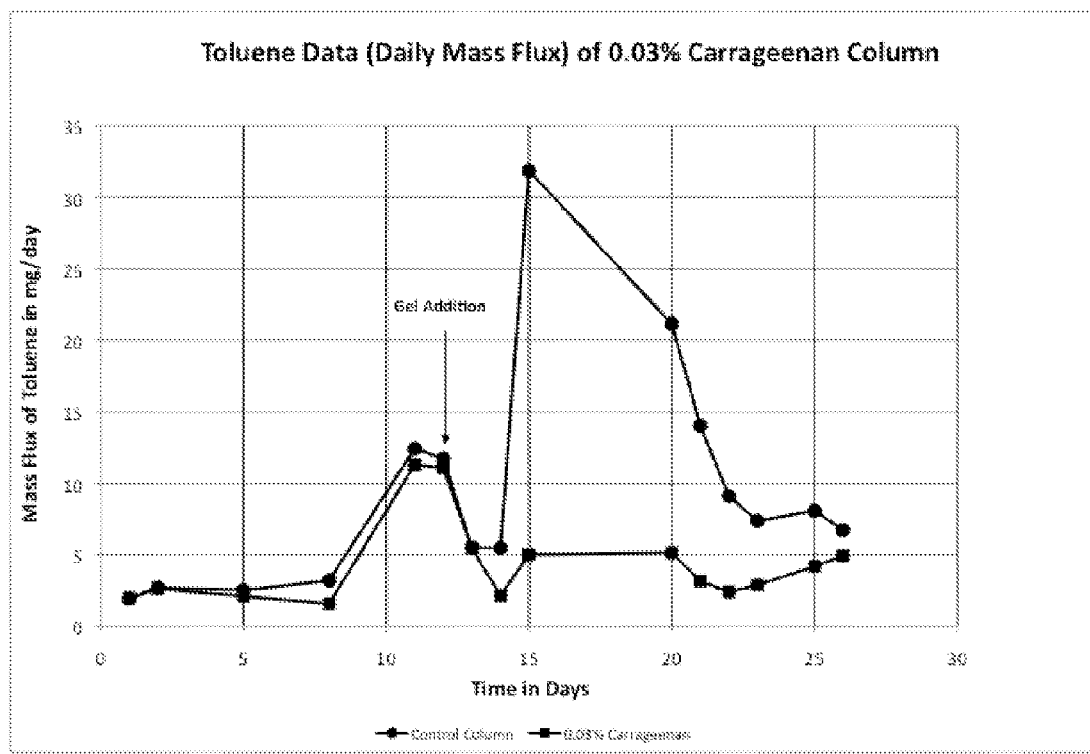
FIG. 6 shows the reduction of toluene mass flux in a carrageenan column of a first embodiment.
Figure 7:
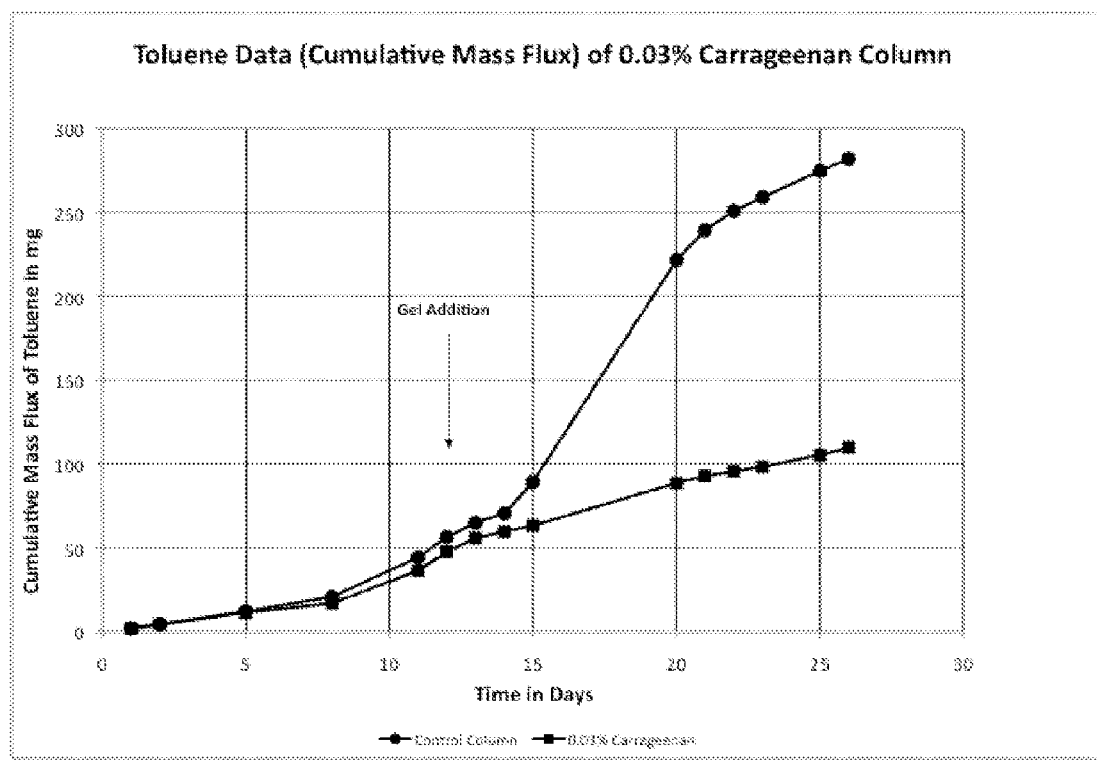
FIG. 7 shows the reduction of toluene cumulative mass flux in a carrageenan column of a first embodiment.
Figure 8:
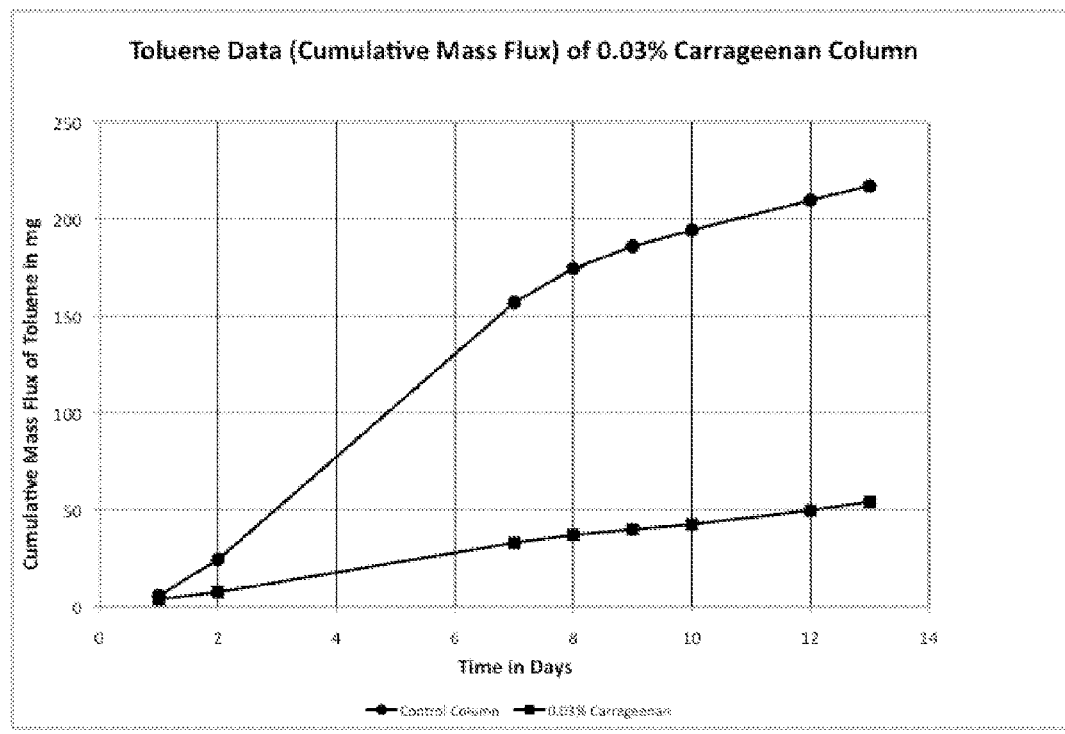
FIG. 8 shows the reduction of toluene cumulative mass flux of FIG. 7 with the time period prior to the solution addition removed.

FIG. 5 shows the comparable toluene concentration data. Saturation also occurred at 27 days and one can see the treated column trending up toward the end. FIG. 6 shows the toluene data plotted taking into account the mass flux. The volumetric flows for the days in which data was taken is multiplied by the concentration on those days to arrive at an amount that was coming through the soil column on that day. FIG. 7 shows the cumulative mass flux in regard to toluene. As can be seen again, there is an obvious reduction between the experimental and control columns. FIG. 8 again shows the results of FIG. 7 starting at the point of composition addition to the experimental column. As can be seen there is a reduction of 76.2% in the toluene that came out of the column after the gel was applied before it saturated. The reduction is about 161 mg of toluene. Since the pore volume was 330 ml the amount of carrageenan used was 99 mg. Thus the sorption of the toluene is 1622% of the weight of carrageenan under the conditions of this experiment.

The combined sorption of TCE plus toluene is 264% of the weight of the carrageenan. This is far greater than the amounts sorbed on the active of carbon samples of the prior art. In the better carbons, the values are about 30% of the weight of the carbon with only one sample getting close to 40%. As such, it is hypothesized that the entrapment is occurring not only in the gel but also in spaces between the gel and the soil in the present invention.

There was no consistent data for octane. The presence of octane is sporadic in the samples since octane is only soluble to 0.6 ppm. Octane was noted in four of the sampling days and where it was noted the treated column always had less by 50-85%. It appears that with octane both columns are removing the bulk of the free phase octane.

Figure 9:
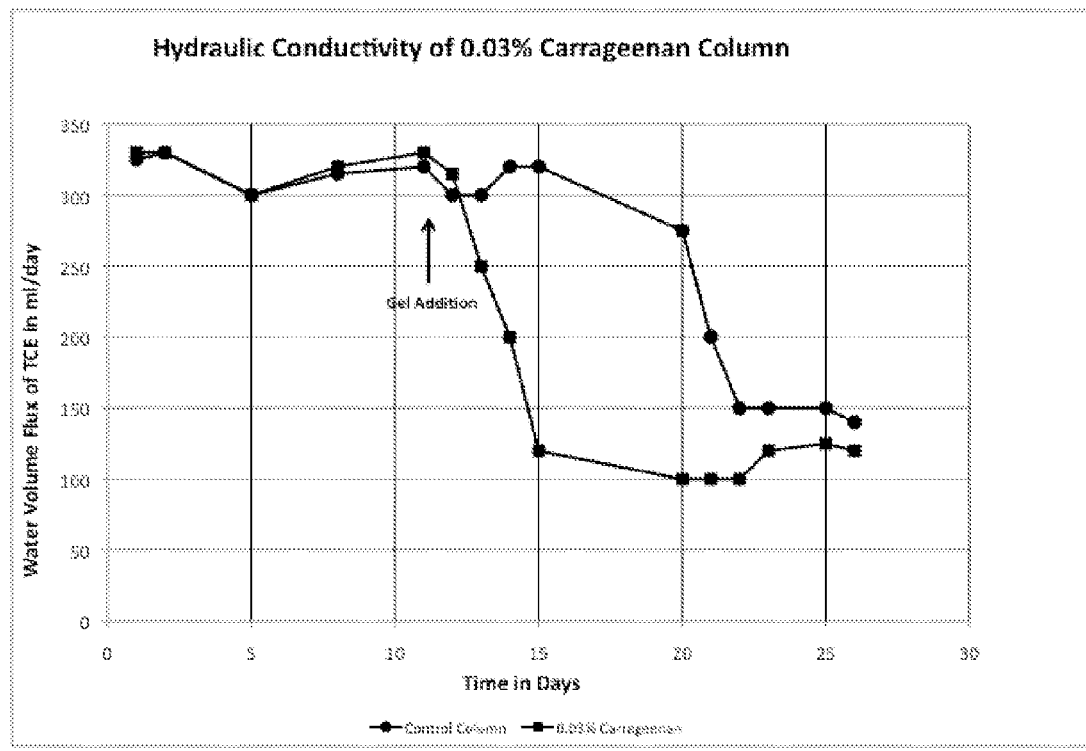
FIG. 9 shows the hydraulic conductivity of a carrageenan column of a first embodiment.

FIG. 9 shows the hydraulic conductivity of the soil during the course of the experiment. After the gel is added in 3 days the water flow drops. However, over the rest of the experiment the control flow drops also, presumably due to the accumulation of octane and the other contaminants.

Figure 19:
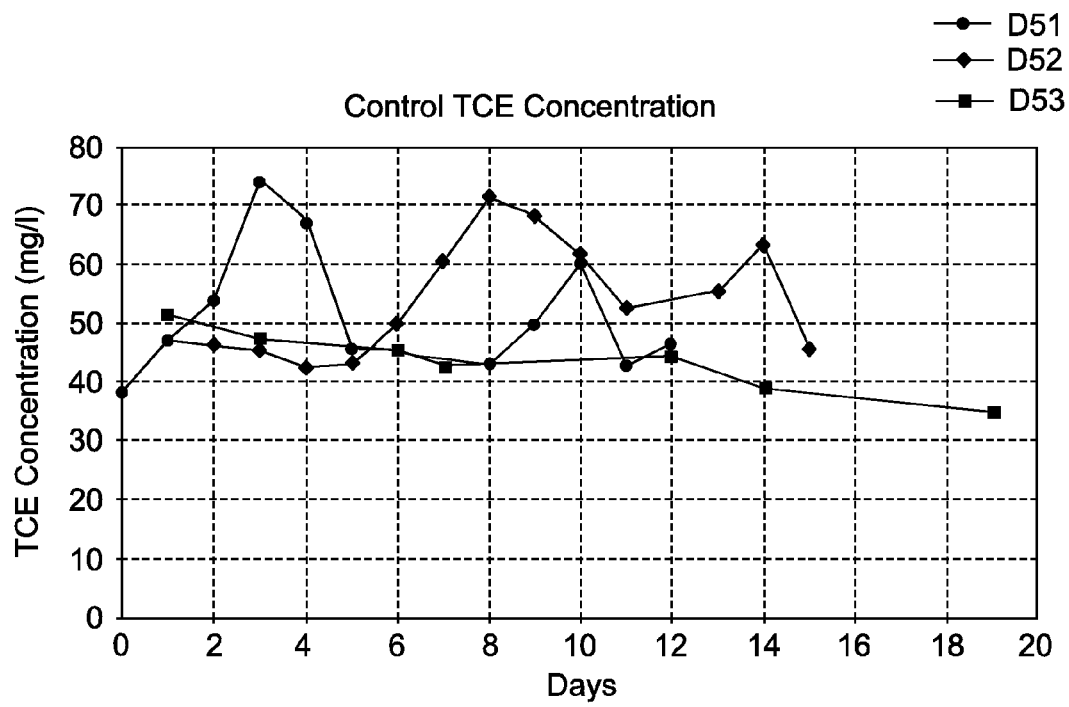
FIG. 19 shows TCE concentration over columns with varying concentrations of carrageenan.

FIG. 19 shows TCE concentration with varying concentrations of carrageenan. As can be seen, the TCE concentrations with 0.05% and 0.10% carrageenan are substantially similar. This is further shown by the fact that a further experiment indicated that the addition of an extra 0.05% carrageenan solution to a column already containing 0.05% carrageenan did not show improvement in the reduction of TCE. As can be seen in FIG. 19, there are slightly reduced results for 0.15% carrageenan. This may suggest that larger concentrations may not flow through the pores as well, but that the solution can still "leak" around the applied material. The total mass flow in such cases, however, may still be much less due to reduced hydraulic conductivity. Similar results were seen with toluene as the contaminant.

Figure 20:
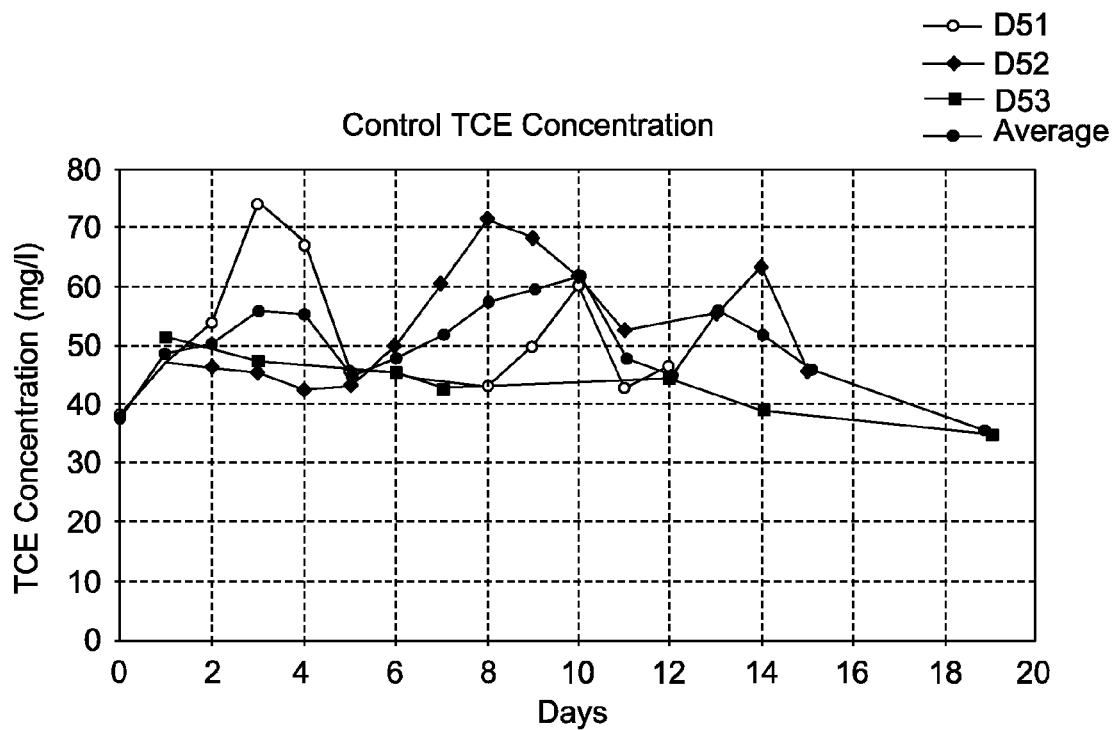
FIG. 20 shows the hydraulic conductivity in columns as a function of how much carrageenan is present.

FIG. 20 shows the flow in columns as a function of how much carrageenan is present. As can be seen, the hydraulic conductivity with 0.15% carrageenan is less than one half the value for 0.05% carrageenan. Accordingly, the concentration could be twice as much and one would still remove the same amount of contaminant. This may be an important point in optimizing the concentration to be added, as reliance on concentration levels will not insure removing more contaminant. Were one to assume that the flow is the same with varying concentrations, wasteful amounts of the product may be consumed with little or no benefit. As such, measurements of flow before and after application of the invention should be measured.

COLUMN EXPERIMENT 2

Summary of Column Experiment 2:

The first solution contains a pre-dissolved amount of gelatin. As made in this embodiment, which is capable of being transported to a contaminated site, the first solution is about 3% by weight of gelatin. The second solution contains a solution of calcium chloride with some added ferrous salt. In this embodiment, the second solution is about 0.045% by weight of calcium chloride and 0.005% of the ferrous salt. These solutions are mixed immediately before injection with water to be used in injecting the mixture. Dilution is made until the gelatin comprises 0.15% to 0.3% of the injection water. Enough solution is injected to be equal to one pore volume of the zone to be treated. This mixture reacts over 2-3 days in the subsurface reducing both the contaminant concentration and the contaminant mass flux. Laboratory data from soil in columns shows that levels as low as 0.03% can reduce the contaminant concentration of TCE, toluene and octane by as much as 80%.

Methods of Column Experiment 2:

Four identical plastic columns were constructed. Each column is three feet tall with a 2 inch diameter. A small amount of glass wool was added to the bottom of each column to prevent the column media from flowing out the bottom valve of the columns. Each column was packed with 1000 grams of ASTM Silt and Sand. The 1000 grams soil mixture contained 750 grams of ASTM Reference Soil ML-1 Silt and 250 grams of ASTM Reference Soil SP Sand. The soils were thoroughly mixed before adding to the columns.

The columns were equilibrated for 3 days with a mixture of octane, TCE and toluene. The solutions were added at approximately 100 mg/l each. The solutions were made up to be analytically 100 mg/l of each but due to evaporative losses this does not mean that the solutions were at that level. TCE and toluene are soluble at that level but they will still have losses due to the equilibrium with the top of the open column. Subsequent data indicates that the evaporative losses on average are half of the initial concentration added to the columns, for example for TCE the loss is approximately 48 ppm and for toluene it is 46 ppm. Samples from the bottom and top of the columns were analyzed to determine the evaporative losses on top the column. Octane is free phase and is expected to act quite differently.

The contaminants were measure by Gas Chromatography (GC). The GC is an SRI GC with and FID and ECD detector, (Flame Ionization Detector and Electron Capture Detector). The column is a Restek, MXT-1, 60 m×0.53 mm×5 um. The carrier gas and makeup gas are nitrogen and set at 20 psi. Helium gas is set at 4 psi, air at 6 psi, and hydrogen at 24 psi. The temperature profile is set at 60 C and held constant for four minutes and then ramps at 10 degrees per minute until 180 C and held at 180 C for another 20 minutes.

The GC was calibrated by serial dilutions of TCE and Toluene. The TCE is was prepared by adding 0.10 grams of TCE into a 1 liter volumetric flask and diluting to the 1 liter mark with distilled water. The solution is covered and mixed to completely dissolve the TCE. Six serial dilutions were completed to calibrate the GC for TCE. The toluene was prepared in the same manner as the TCE. The samples are injected into the GC by injecting 1 micro-liter of the liquid directly into the GC. Calibration curves were produced for both TCE and Toluene. TCE is calibrated on the FID detector as well as the ECD detector, while Toluene is calibrated on the FID detector. The octane peak has been identified on the GC with the FID and lower levels are calibrated in methanol to insure uniform dispersion. In this experiment the columns are plastic and the GC spectrum is showing two unknown peaks from elution of the plastics that were not seen in the glass column experiments of Experiment 1.

The four columns reached equilibrium after day three. On the fourth day, three different gels of different concentrations were added to three of the four columns. One column contained 0.15% gelatin mix, the second column contained 0.3% gelatin mix and the third column contained 0.15% carrageenan gel mix. The fourth column was left as a control column. The carrageenan gel was prepared by dissolving 3 grams of carrageenan in 97 grams of water. The solution is stirred and heated until on the carrageenan is dissolved. The mixture is cooled and a gel forms. While the gel was forming, a separate solution containing 0.45 grams of calcium chloride and 0.05 grams of ferric chloride in one liter of water was prepared. The solution was mixed until the salts dissolved, which resulted in a 0.045% calcium chloride solution and 0.005% ferric chloride. To make the 0.15% carrageenan gel, fifteen grams of the 3% carrageenan gel solution was mixed with 285 ml of the salt solution. The resulting gel solution contained 0.15% carrageenan. The gelatin gel was prepared by dissolving 3 grams of gelatin in 97 grams of water. The solution is stirred and heated until the entire gelatin was dissolved. The mixture is cooled and a gel forms. While the gel was forming a separate solution containing 0.45 grams of calcium chloride and 0.05 grams of ferric chloride in one liter of water was prepared. The solution was mixed until the salts dissolved, which resulted in a 0.045% calcium chloride solution and 0.005% ferric chloride. To make the 0.15% gelatin gel, fifteen grams of the 3% gelatin concentrate solution was mixed with 285 ml of the salt solution. The resulting gel solution contained 0.15% gelatin, respectively for the 0.3% gelatin mix 30 grams of the gelatin concentrate was added to 270 grams of the salt solution. The different gel mixtures were added on top of the three different columns while 300 ml of tap water was added on top of control column. The gelatin mixes were too concentrated to completely move through the column in the 24 hours. On sampling days, columns were kept loaded with contaminant solution during the entire experiment. At each sampling interval a sample was taken from the bottom of each column and analyzed as described above on the GC.

Figure 10:
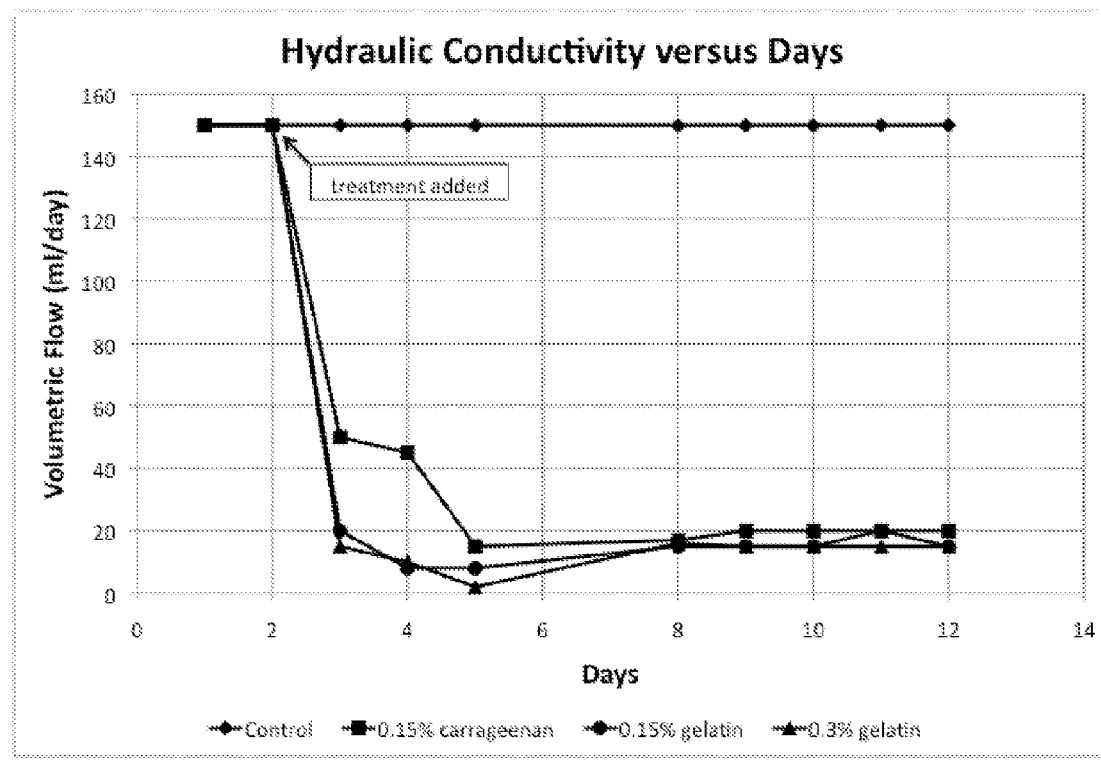
FIG. 10 shows the hydraulic conductivity of carrageenan and gelatin columns of a second embodiment.

Results of Column Experiment 2:

FIG. 10 shows the hydraulic conductivity of the four columns used in this experiment. As can be seen, with these higher concentrations there is an approximately 90% reduction in water flow. In the case of higher value of concentration of the contaminant capture material (as in Experiment 2) the drop in flow is much greater. While this is expected, the differences between concentration reduction and mass flux reduction are not expected and are believed due to the complicated interaction with the surfaces and different porosity of the matrices.

Figure 11:
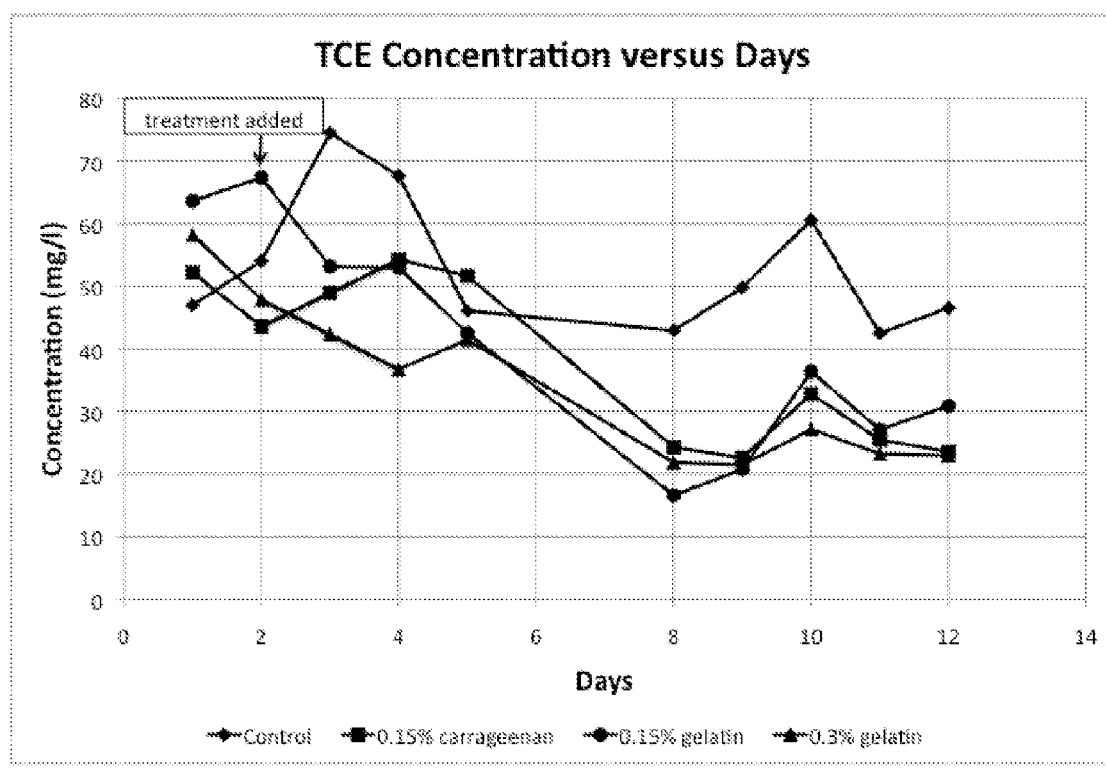
FIG. 11 shows the reduction of TCE concentration in the columns of the second embodiment.
Figure 12:
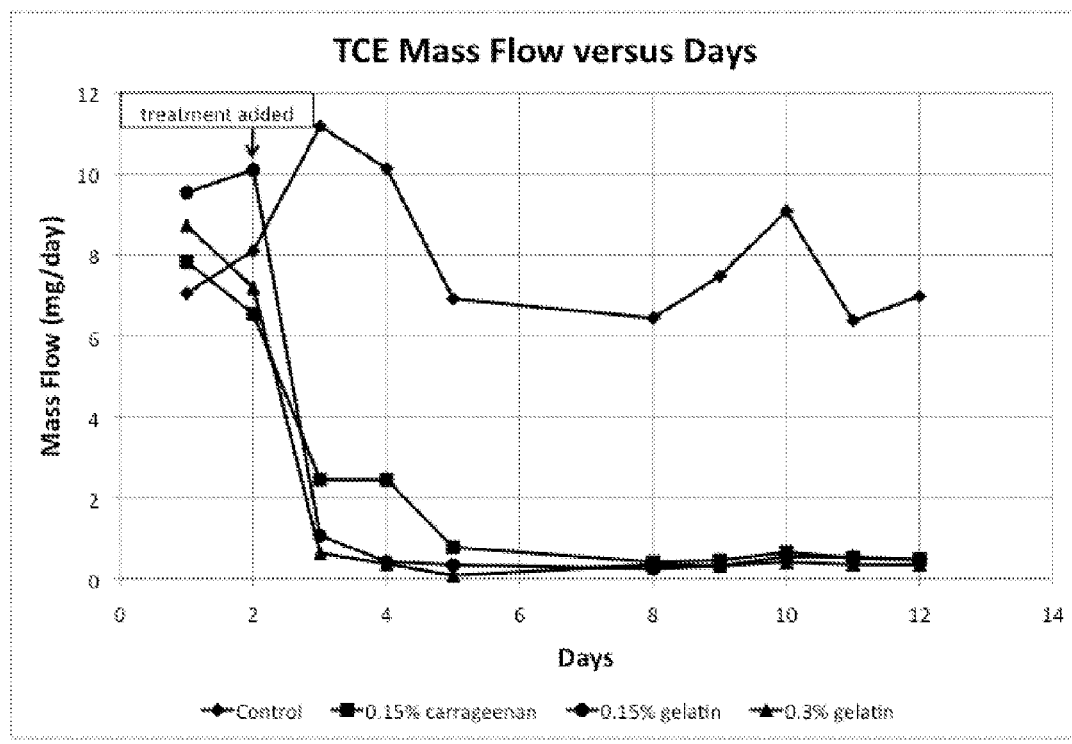
FIG. 12 shows the reduction of TCE mass flow in the columns of the second embodiment.
Figure 13:
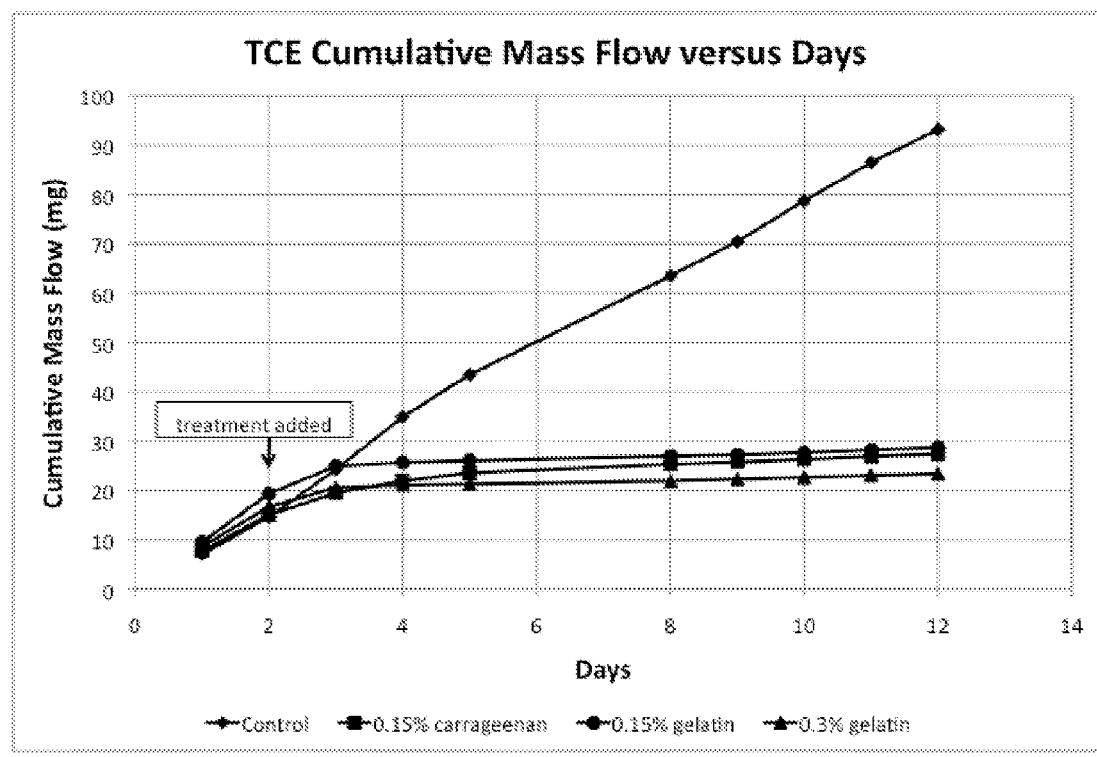
FIG. 13 shows the reduction of TCE cumulative mass flow in the columns of the second embodiment.

FIG. 11 shows the reduction in concentration of TCE. Both the 0.15% carrageenan and the 0.3% gelatin columns reduce the concentration by at least 50%. The soil appears to be saturated in TCE, or very close to it, in the control. FIG. 12 shows the mass flow in regard to TCE. As can be seen, the experimental columns reduce the TCE mass flow by about 97%. FIG. 13 shows the cumulative mass flow reduction of the columns of this embodiment.

Figure 14:
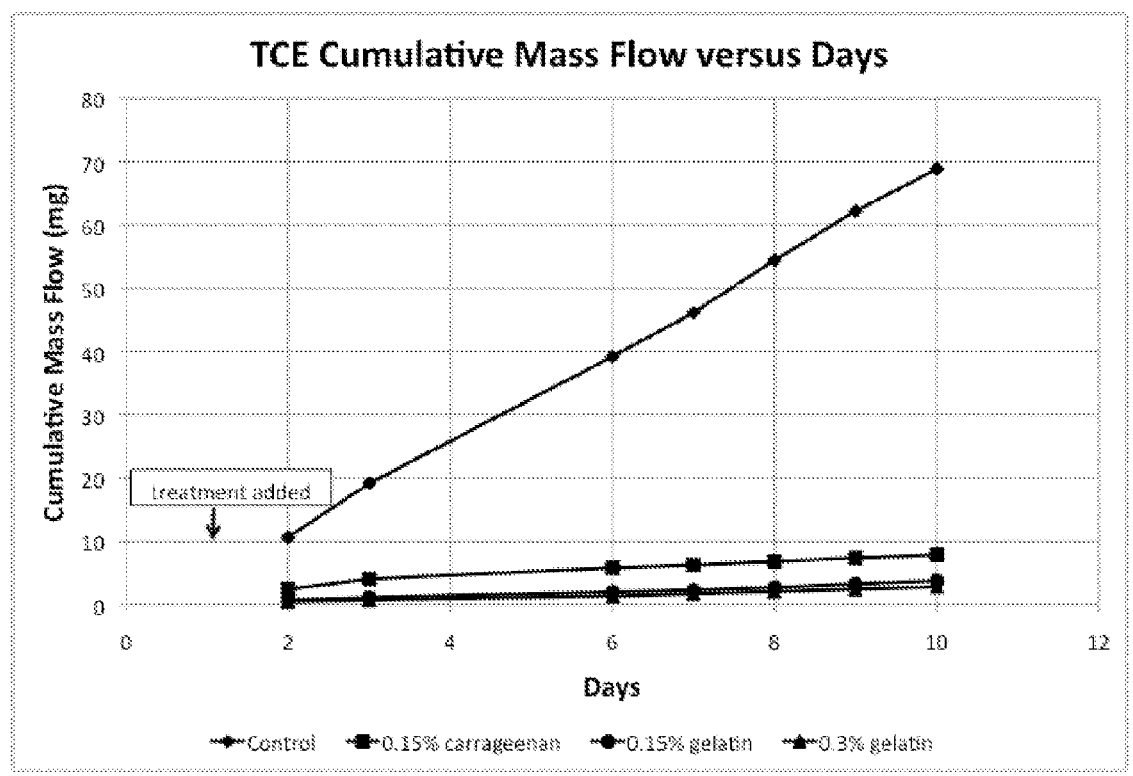
FIG. 14 shows the reduction of TCE cumulative mass flow of FIG. 13 with the time period prior to the solution addition removed.

FIG. 14 shows the data of FIG. 13 starting at the point of composition addition to the experimental columns. The cumulative mass flow is reduced by about 87% for the 0.15% carrageenan column and 91% for both of the gelatin columns. Although these are very useful and desirable results, it is noted that the efficiency of the contaminant capture material is lower than in the previous 0.03% carrageenan test of Experiment 1. At 0.15% there is 495 mg of contaminant capture material in the system. There is 990 mg at 0.3%. The carrageenan in this example has removed 61 mg. The weight efficiency is thus 12.3% compared to 102% in the 0.03% case. For the gelatin columns, the amount used in the 0.3% column provides no real benefit compared to the 0.15% column. At 0.15% the gelatin is removing about 13.3% of its weight.

Figure 15:
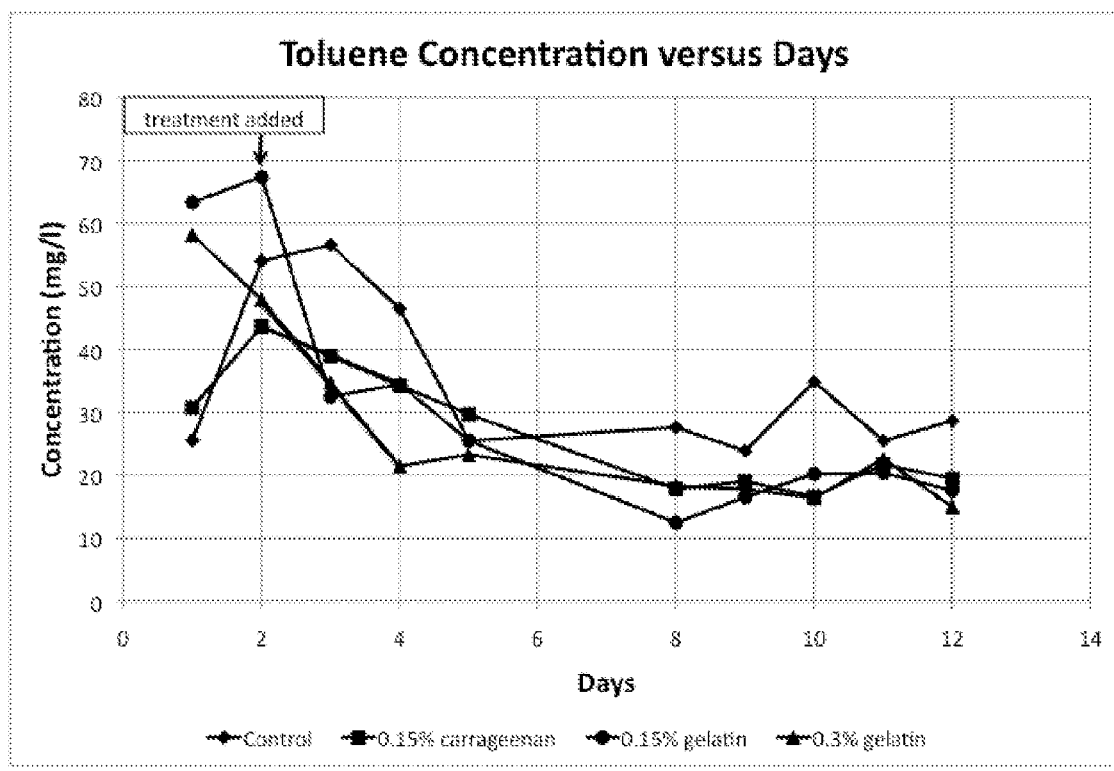
FIG. 15 shows the reduction of toluene concentration in the columns of the second embodiment.
Figure 16:
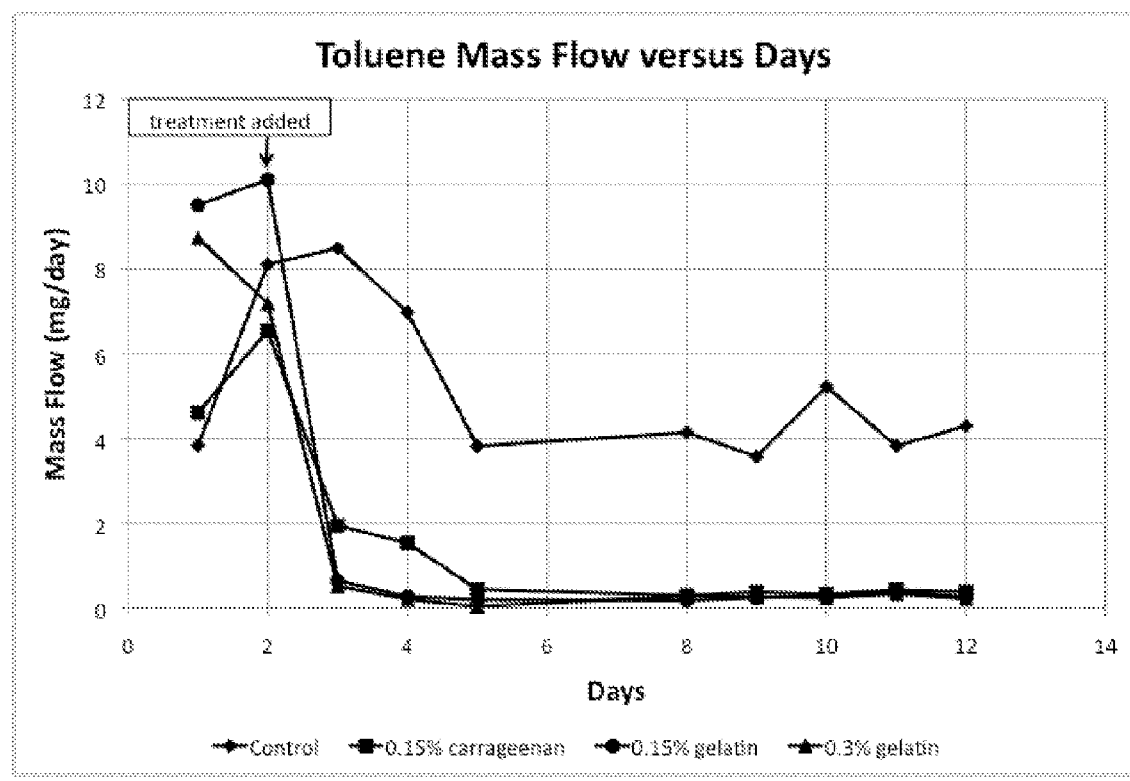
FIG. 16 shows the reduction of toluene mass flow in the columns of the second embodiment.

FIG. 15 shows the toluene concentration effects of the experimental columns. In this case, it appears that the soil is still removing toluene, unlike the TCE case where it appeared to be saturated. The soil appears to be removing a constant 20 mg/l per day. FIG. 16 shows the reduction of toluene mass flow in the experimental columns versus the control column. As the graph shows, all three experimental columns reduce the toluene mass flow by at least 90%.

Figure 17:
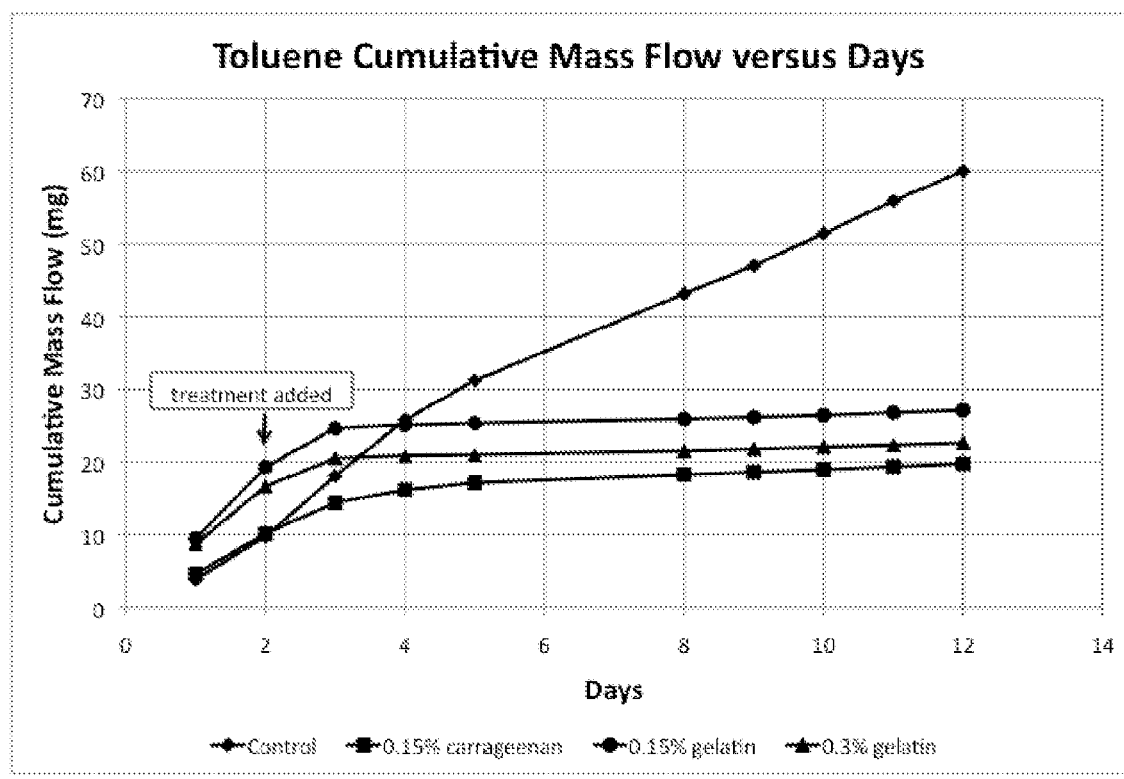
FIG. 17 shows the reduction of toluene cumulative mass flow in the columns of the second embodiment.
Figure 18:
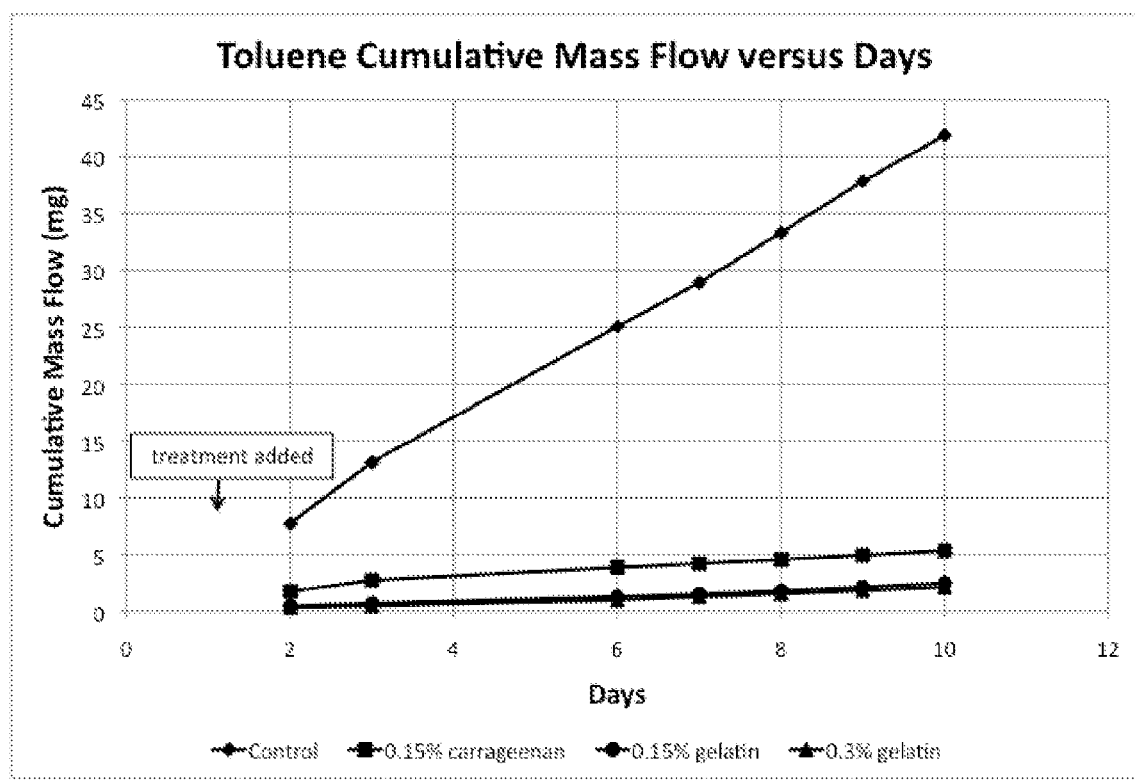
FIG. 18 shows the reduction of toluene cumulative mass flow of FIG. 17 with the time period prior to the solution addition removed.

FIG. 17 shows the cumulate mass flow reduction in regard to toluene. As can be seen, it appears to show that the carrageenan column removes slightly more toluene than the gelatin columns. FIG. 18 shows the data of FIG. 17 starting at the point of composition addition. The gelatin columns reduced the mass flow of toluene by about 94%, while the 0.15% carrageenan column reduced it 88%. The weight removal efficiency of the gelatin is 8% at 0.15% and 4% at 0.3% concentration. The weight removal efficiency of the carrageenan is 7.6% at 0.15%.

Figure 21:
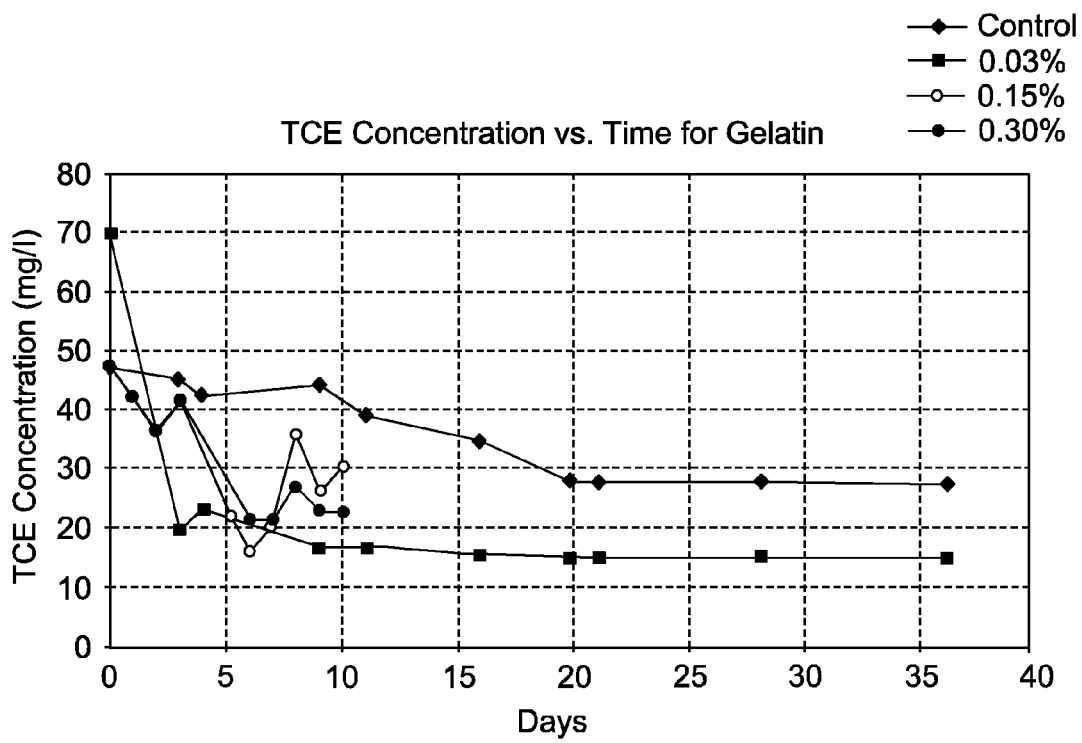
FIG. 21 shows the TCE concentration over columns of varying amounts of gelatin.

FIG. 21 shows the TCE concentration over columns of varying amounts of gelatin. As can be seen, larger concentrations (0.15% and 0.30%) of gelatin take longer to permeate the column and affect TCE concentration. As can be seen with the 0.03% column, the effects are long lasting. As compared to carrageenan, wherein effectivity diminishes after two weeks, gelatin's effects continue for at least 35 days.

These findings are consistent with a multilayer of the carrageenan or gelatin being applied that is not quite as porous and thus not allowing as much water and contaminant to penetrate into the capturing layer and allowing the contaminant to become trapped while the water flows out. One of the non-obvious points of the invention is that making the layers more "hydrophobic" (more like the contaminant since hydrophobic solvents dissolve hydrophobic materials) is not a mechanism in this case. The contaminants are not being dissolved in the contaminant capture material but rather trapped inside a matrix that allows water to move through. This is more similar to a size exclusion resin coupled with large internal pore spaces that it is a solubility issue. These results distinguish this mechanism from the use of an oil or solvent based system for capturing contaminants.

Similar column experiments were run with agar as the contaminant capture material. Columns were run with agar concentrations of 0.05% and 0.10%. Overall, the results were found to closely match those of carrageenan. In particular, the reductions of TCE were comparable to those for carrageenan and gelatin. However, agar did not reduce the mass flow as much as either gelatin or carrageenan. An additional experiment was conducted in which a second application of 0.05% agar was added to an initial 0.05% agar column. The addition of a second 0.05% application did not significantly affect the results for TCE removal but did appear to have a greater effect on toluene removal.

STATIC AQUIFER SIMULATION EXPERIMENTS

Each static aquifer simulation is contained within a 16 inch high, 19 inch inside diameter open top plastic cylindrical container. Inside this container is a second container of 12 inch height and 11.5 inch inside diameter. The two containers are arranged so that the centers are aligned. A tight fitting lid is used that rests on the top of the inside container and fits against the sides of the outer container. The inside container has a central slotted and screened 1.875 inch outside diameter, 0.75 inch inside diameter slotted and screened tube fixed to the bottom of the inside container. This tube is 6 inches in height and simulates a well in a static aquifer. At 5.5 inches around the periphery of the inside container, 0.125 inch holes were drilled every 1.5 inches to allow water to seep into the inside container from the annular space between the two containers.

The inside container was filled to a depth of 4 inches with 10 kg of soil. The soil utilized is made up of 2.5 kg ASTM sand and 7.5 kg ASTM silt. The active volume of the soil in the inside container was 6.65 liters. The dry soils were prepared by immersion saturation in 5 liters of a solution containing 1500 mg/L of benzene, 400 mg/L of toluene, 100 mg/L of ethyl benzene, and 100 mg/L of xylene (collectively BTEX). The inside containers were filled with this solution and the excess liquid drained off. A residual of 2.6 liters remained in the soil. The resulting pore volume of 39% of the soil volume based upon the retained liquid indicated a degree of supersaturation.

Two such systems were prepared, one being the control and the other the test. In the test system, the soil surface was injected with a 3% carrageenan solution mixed with a 0.15% $CaCl_2$ solution as the cross-linking agent in a uniform pattern across the surface, additionally 0.03% $FeSO_4$ was added to act as an electron shuttle for bioremediation of the contaminants. The amount injected was calculated to provide a 0.1% carrageenan solution in the pore volume of the aquifer taken as 30% of the 6.65 liter soil volume, i.e., 2 liters. 2 liters of plain water was injected into the control system. The outside annular space in both systems was filled with plain tap water and allowed to trickle into the soil present in the inner container. This, in turn, causes water to flow into the wells. The wells were emptied periodically and the removed water is analyzed and measured. The reservoir of plain water was replaced with the volume removed so as to keep a constant flow across the soil from the outside to the well.

Figure 22:
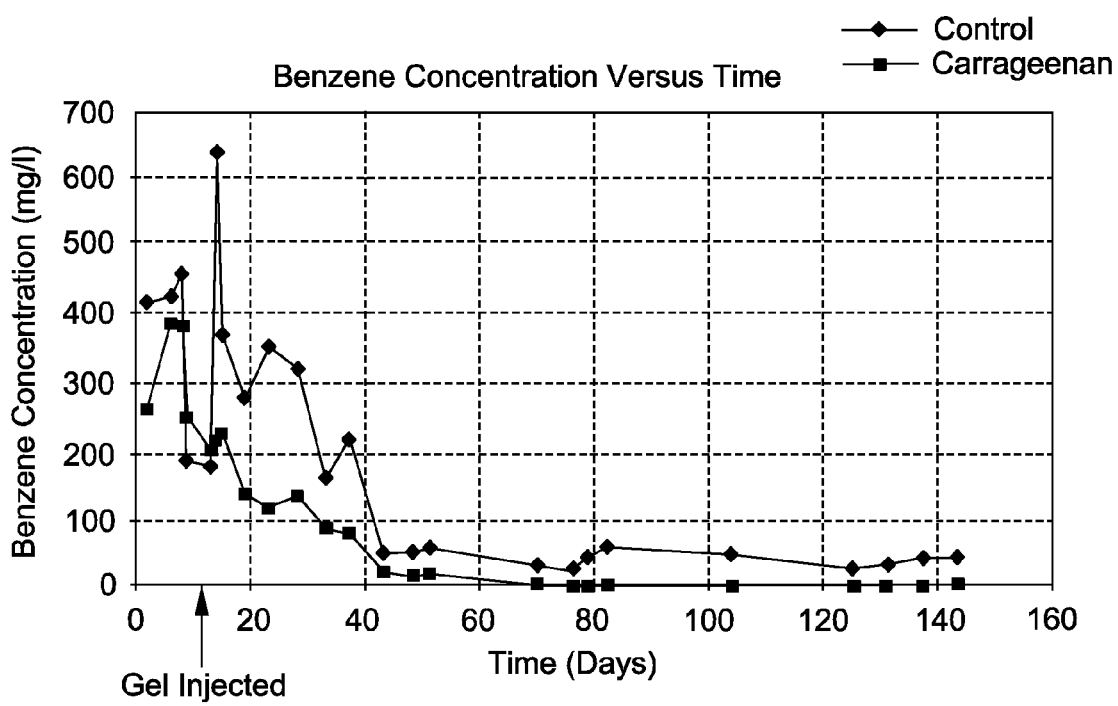
FIG. 22 shows the difference of contaminant concentration between the control and test systems in a static aquifer experiment.
Figure 23:
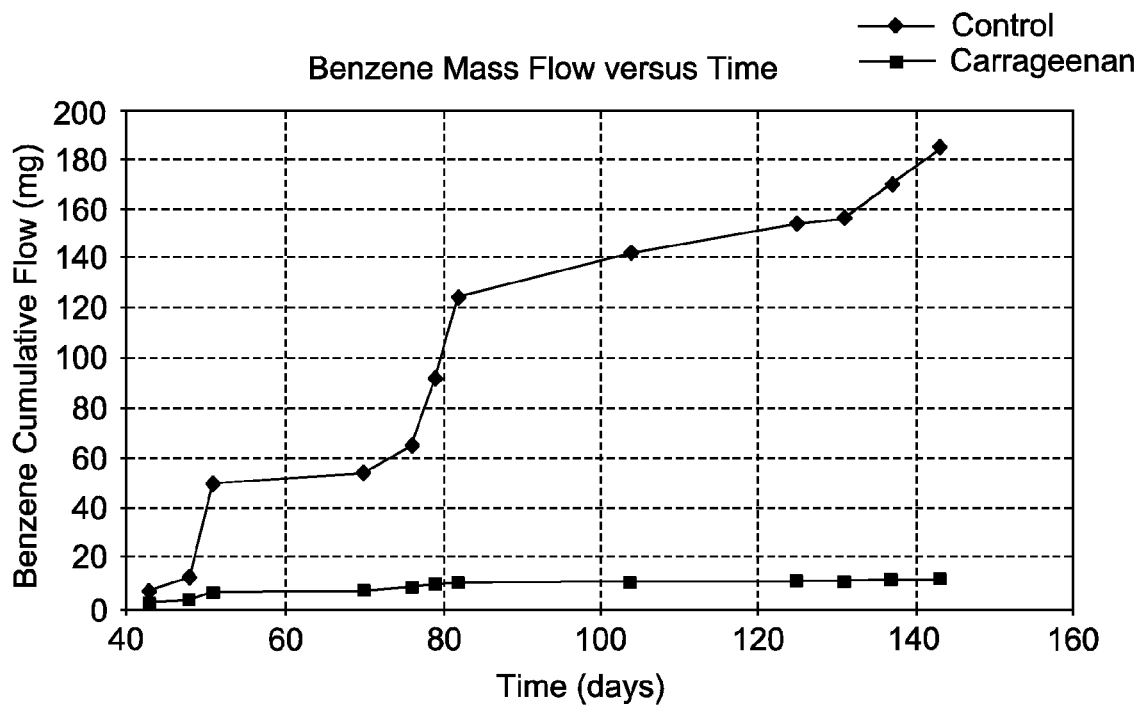
FIG. 23 shows the cumulative mass flow of benzene through the static systems.
Figure 24:
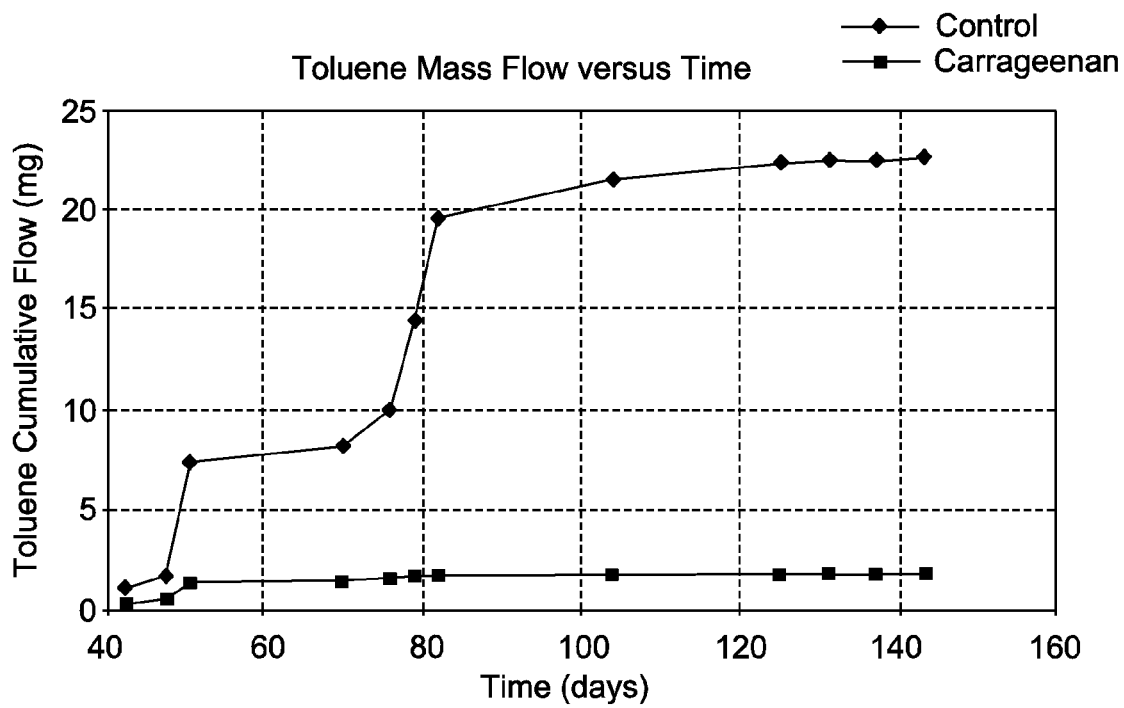
FIG. 24 shows the cumulative mass flow of toluene through the static systems.
Figure 25:
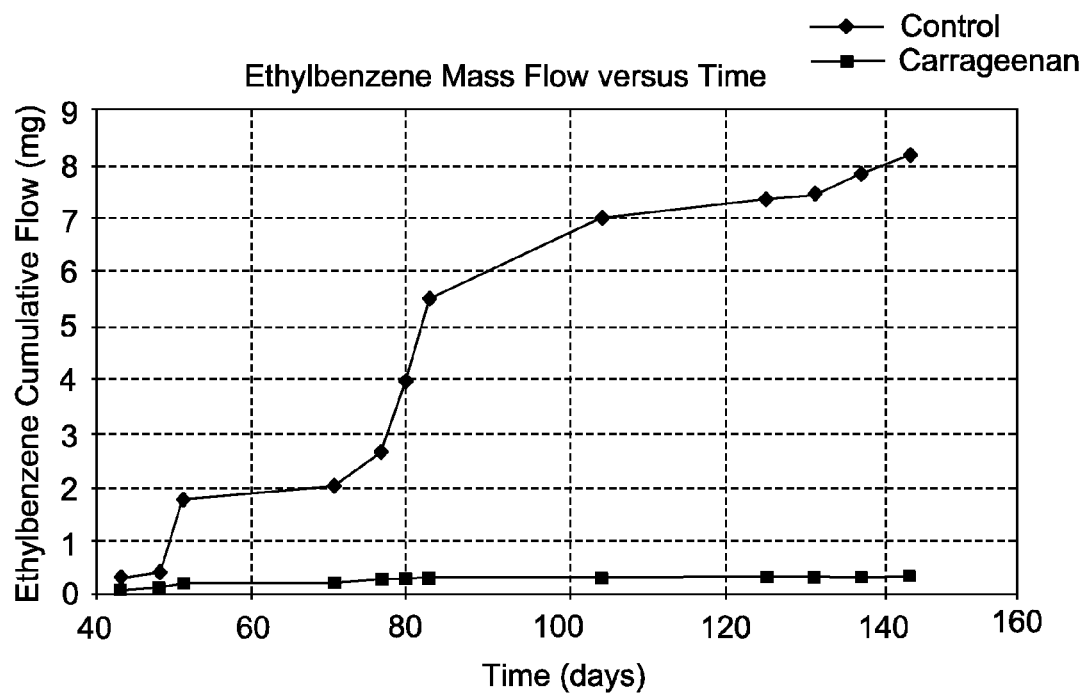
FIG. 25 shows the cumulative mass flow of ethylbenzene through the static systems.
Figure 26:
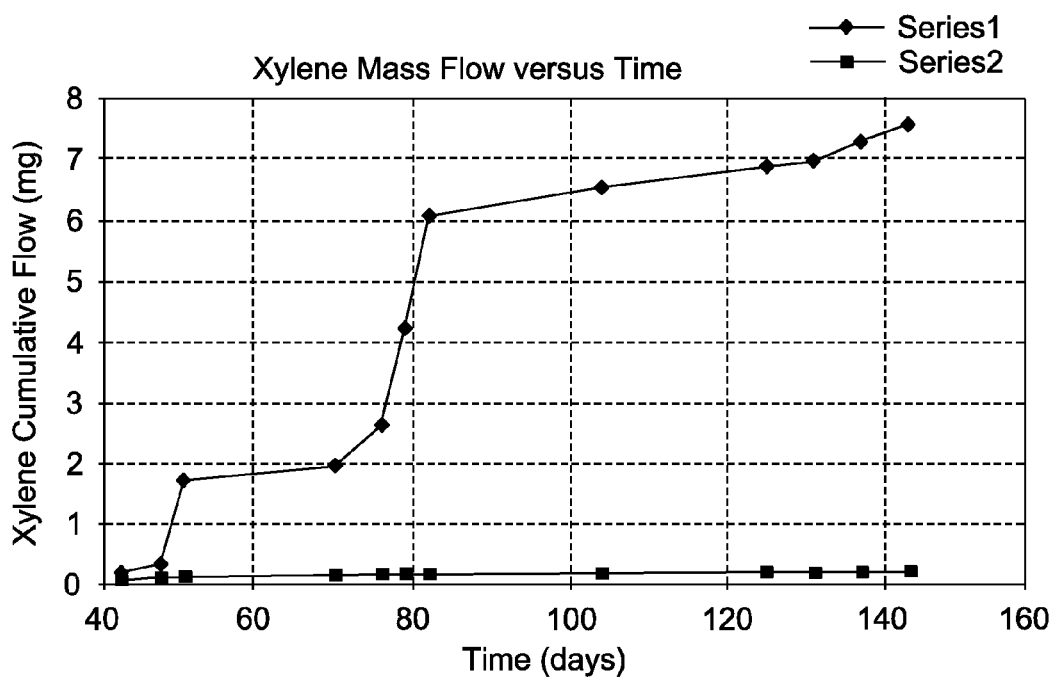
FIG. 26 shows the cumulative mass flow of xylene through the static systems.

As can be seen in FIG. 22, it takes approximately three to four days for the carrageenan to cross-link after injection and then the difference of contaminant concentration between the control and test systems becomes much more pronounced. The flow rate through the carrageenan treated soil was about 40-45% of the flow in the control system. FIG. 23 shows the cumulative mass flow of benzene through the static systems. FIG. 24 shows the cumulative mass flow of toluene through the static systems. From the point of addition of the carrageenan approximately ten times as much toluene has flowed out of the control system versus the test. The ratio is approximately the same for benzene. FIG. 25 shows the cumulative mass flow of ethylbenzene through the static systems. FIG. 26 shows the cumulative mass flow of xylene through the static systems. The results of these static aquifer systems is directly in line with problems seen in real aquifers. In particular, it takes an extremely long time to elute contaminants out of soil. This makes it very difficult to "approve" polluted sites because the contaminant will keep coming out of the soil. As can be seen, the carrageenan solutions disclosed herein are a very useful tool in capturing contaminants. This effect is not due simply to reduction of hydraulic conductivity, but also due to the increased binding in the carrageenan matrix.

CAGE SIZE EXPERIMENTS

Figure 27:
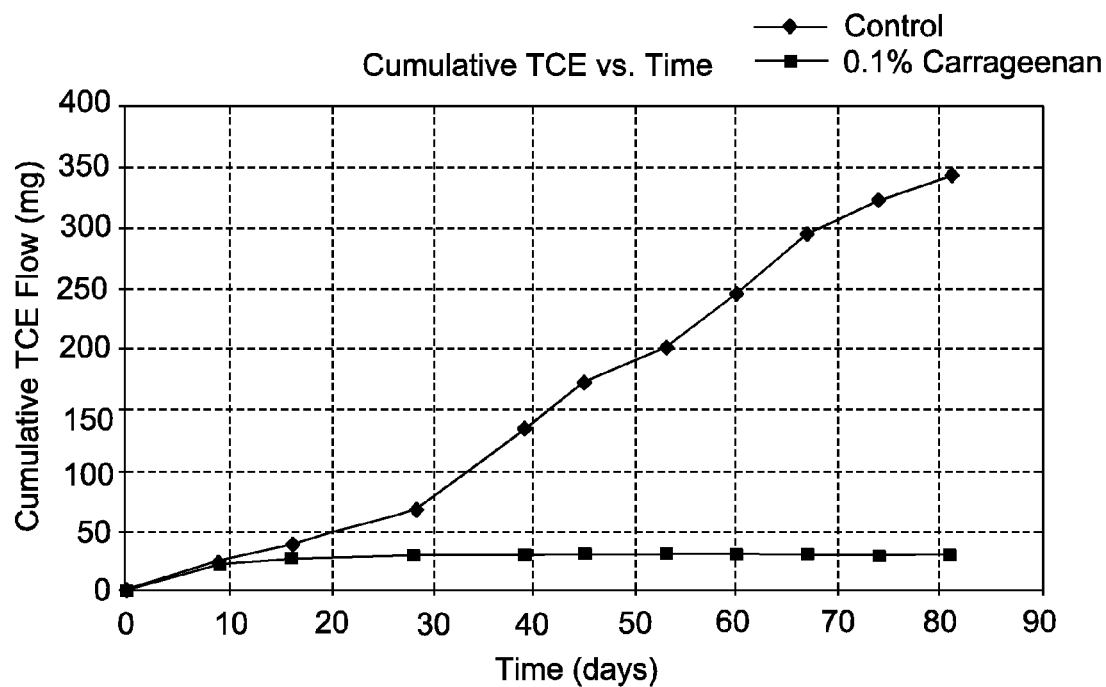
FIG. 27 shows the cumulative mass flow of TCE over a carrageenan column.
Figure 28:
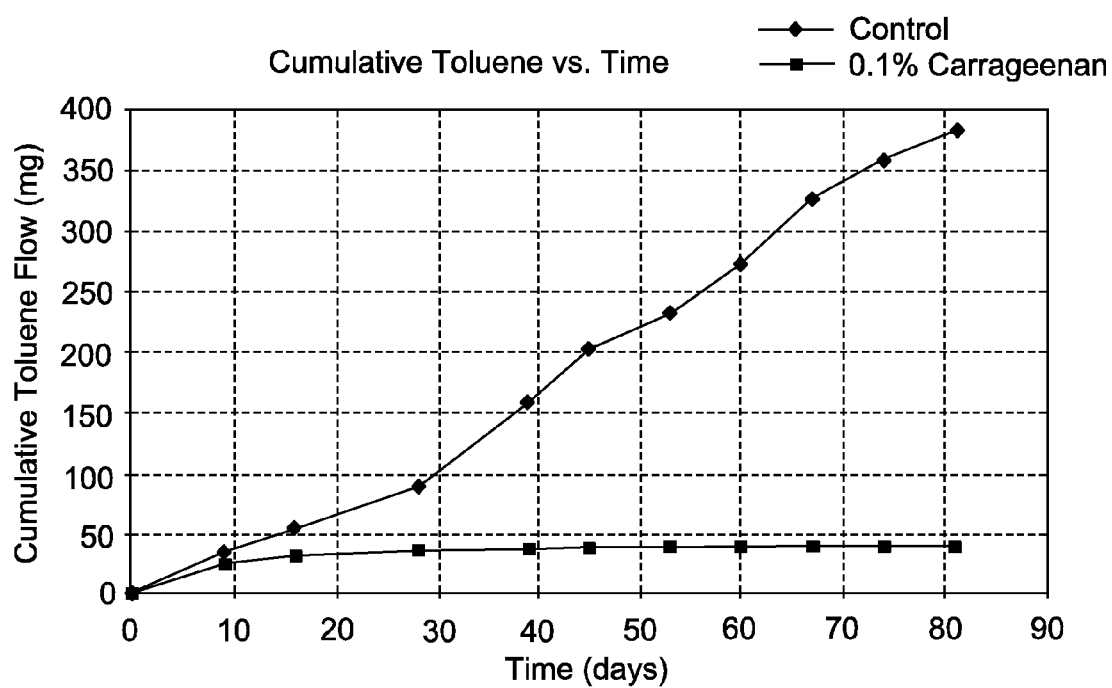
FIG. 28 shows the cumulative mass flow of toluene over a carrageenan column.
Figure 29:
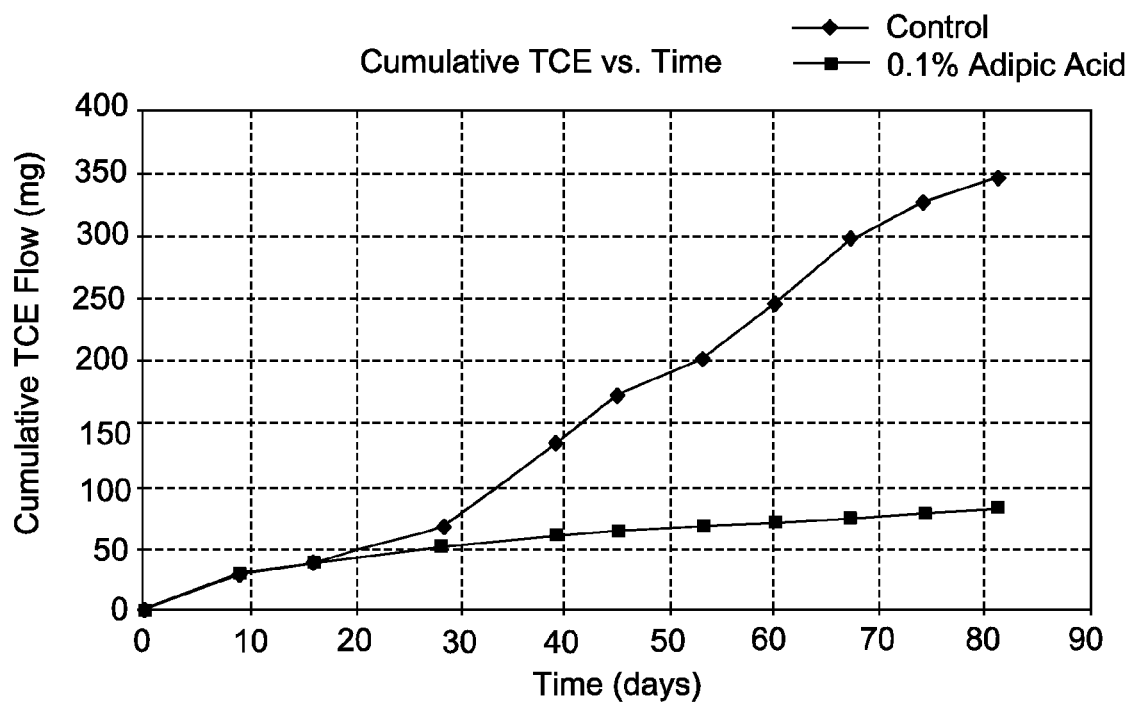
FIG. 29 shows the cumulative mass flow of TCE over an adipic acid column.
Figure 30:
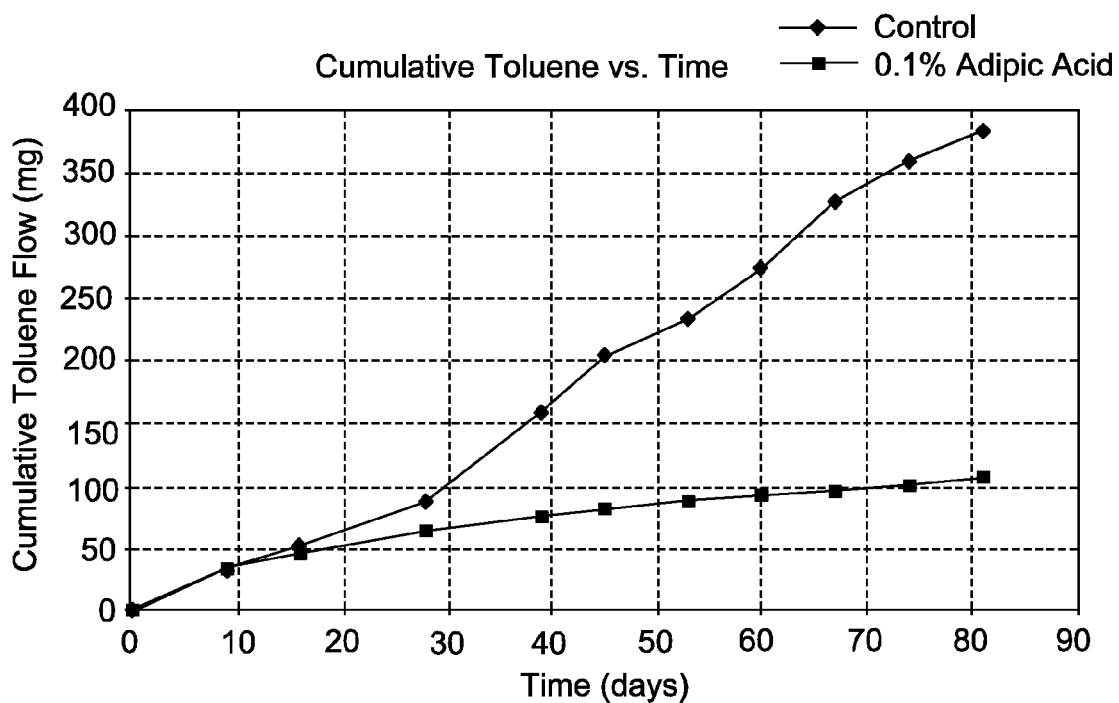
FIG. 30 shows the cumulative mass flow of toluene over an adipic acid column.
Figure 31:
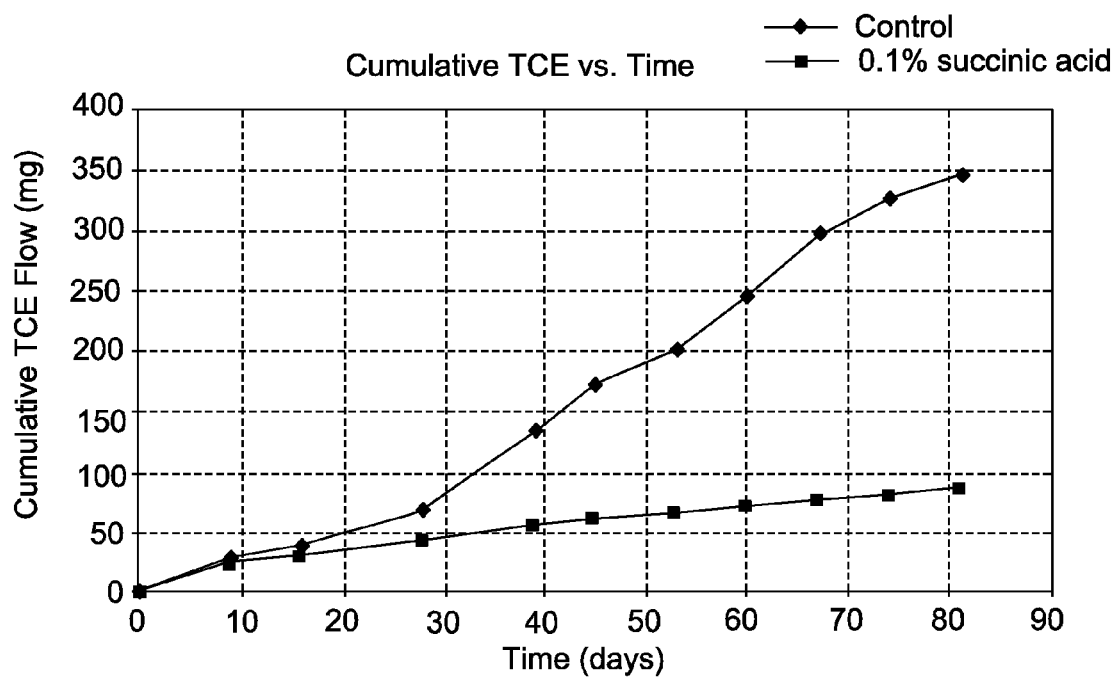
FIG. 31 shows the cumulative mass flow of TCE over a succinic acid column.
Figure 32:
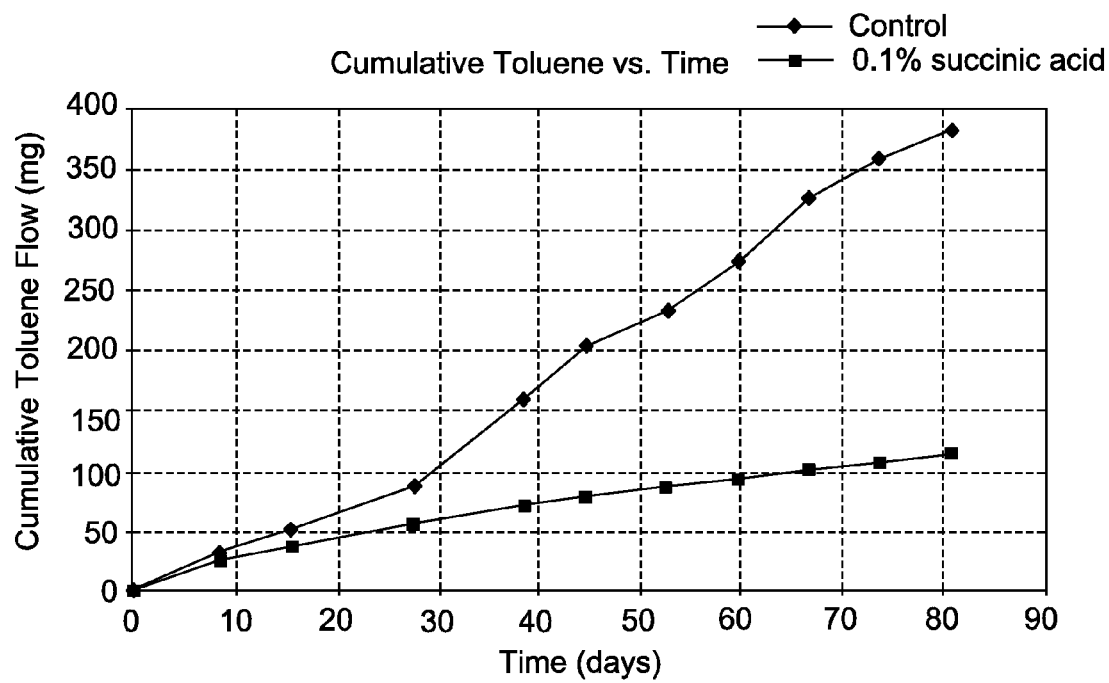
FIG. 32 shows the cumulative mass flow of toluene over a succinic acid column.

Column experiments similar to those presented above were conducted to verify that CCMs with larger cage sizes result in increased contaminant capture. To verify this understanding, iota carrageenan as described above was utilized, followed in size by adipic acid cross-linked with calcium ion, and succinic acid cross-linked with calcium ion. Four columns were prepared as discussed above with 75% silt and 25% sand. The contaminants utilized were 100 mg/L of TCE and 100 mg/L of toluene. A 0.1% solution of carrageenan, a 0.1% solution of adipic acid, a 0.1% solution of succinic acid, and fresh water were added to a column, respectively. As can be seen in FIGS. 27-32, carrageenan captured the most contaminants, followed by adipic acid, then followed by succinic acid. In particular, FIGS. 27, 29, and 31 show the total mass flow of TCE over the carrageenan, adipic acid, and succinic acid columns, respectively, while FIGS. 28, 30, and 32 show the total mass flow of toluene over the same columns. The results verified the belief that larger cage sizes would capture a greater amount of contaminants. These results show that materials with cross-linking via ionic bridging to sulfate or carboxyl groups create cages useful in capturing contaminants, and particularly that difunctional carboxylic acids can be engineered to make active contaminant capture materials.

The above description is given by way of example, and not limitation. Given the above disclosure, one skilled in the art could devise variations that are within the scope and spirit of the invention disclosed herein, including various solutions and adjuvants. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A system for treatment of subsurface soil in an aquifer to increase the sorption of contaminants in water comprising:
   a first solution comprising at least one chemical capable of being effectively bound to soil to form a sorbent matrix by reaction in the subsurface; and
   a second solution comprising at least one chemical capable of reacting with at least one chemical in the first solution to create the matrix;
   wherein the first and second solutions react on a time scale allowing at least one chemical in the first solution to bind to the soil, and wherein the first or second solution contains ferrous sulfate.

2. The system of claim 1 wherein one or both of the solutions further comprise at least one additive to enhance the sorption of contaminants.

3. The system of claim 1 wherein one or both of the solutions further comprise at least one additive to enhance microbial activity.

4. The system of claim 2 wherein the additive is selected from the group consisting of sorbitol esters, sorbitan esters, glycerol monoesters, and sulfhydryl amino acids.

5. The system of claim 3 wherein the additive is selected from the group consisting of peroxides, nitrates, lactic acid, and salts thereof.

6. The system of claim 1 wherein the first solution comprises 3.0% carrageenan.

7. The system of claim 6 wherein the carrageenan is of the iota form.

8. The composition of claim 1 wherein the first solution comprises 3.0% gelatin.

9. The system of claim 1 wherein the first solution comprises 3.0% succinic acid.

10. The system of claim 1 wherein the first solution comprises 3.0% adipic acid.

11. The system of claim 1 wherein the first solution comprises 3.0% sucrose disuccinate.

12. The system of claim 1 wherein the second solution comprises a chloride, lactate, acetate, or nitrate salt.

13. The system of claim 12 wherein the second solution comprises 0.045% calcium chloride.

14. The system of claim 1 wherein the first or second solution further comprises 0.005% ferrous sulfate.

15. A method of capturing contaminants from subsurface soil or water in an aquifer, said method comprising the steps:
   a. providing a first solution comprising at least one environmentally acceptable chemical capable of being effectively bound to soil to form a sorbent matrix by reaction in the subsurface;
   b. providing a second solution comprising at least one environmentally acceptable chemical capable of reacting with one or more chemicals in the first solution to create the matrix;
   c. mixing the first solution with the second solution in a quantity that amounts to a liquid volume having a sufficient concentration capable of effectively removing the contaminants present in at least one pore volume of the soil and included water volume to be treated; and
   d. injecting such composition into the subsurface such that the chemicals in the first and second solutions react on a time scale to allow the chemicals in the first solution to coat and bind to the soil;
      wherein the first or second solution contains ferrous sulfate.

16. The method of claim 15 wherein one or both of the solutions further comprise at least one additive to enhance the sorption of contaminants.

17. The method of claim 15 wherein one or both of the solutions further comprise at least one additive to enhance microbial activity.

18. The method of claim 16 wherein the additive is selected from the group consisting of sorbitol esters, sorbitan esters, glycerol monoesters, and sulfhydryl amino acids.

19. The method of claim 17 wherein the additive is selected from the group consisting of peroxides, nitrates, lactic acid, and salts thereof.

20. The method of claim 15 wherein the first solution in step a) comprises 3.0% carrageenan.

21. The method of claim 20 wherein the carrageenan is of the iota form.

22. The method of claim 15 wherein the first solution in step a) comprises 3.0% gelatin.

23. The method of claim 15 wherein the first solution in step a) comprises 3.0% succinic acid.

24. The method of claim 15 wherein the first solution in step a) comprises 3.0% adipic acid.

25. The method of claim 15 wherein the first solution in step a) comprises 3.0% sucrose disuccinate.

26. The method of claim 15 wherein the second solution comprises a chloride, lactate, acetate, or nitrate salt.

27. The method of claim 26 wherein the second solution in step b) comprises 0.045% calcium chloride.

28. The method of claim 15 wherein the first or second solution further comprises 0.005% ferrous sulfate.

29. The method of claim 15 wherein the first and second solutions are mixed in step c) and further diluted with water such that the at least one environmentally acceptable chemical of the first solution has a concentration of 0.03% to 0.15%.

30. The method of claim 29 wherein the first and second solutions are mixed in step c) and further diluted with water such that the at least one environmentally acceptable chemical of the first solution has a concentration of 0.1%.

31. The method of claim 27 wherein the amount of calcium chloride in the second solution is reduced by the amount of calcium present in the subsurface soil to maintain an overall concentration of 0.045% calcium in the subsurface.

32. The method of claim 15, wherein the contaminants are captured within the matrix for a sufficient time to allow bioremediation of the contaminants to occur.

33. A method of capturing contaminants from subsurface soil or water in an aquifer wherein said subsurface soil contains naturally occurring calcium, said method comprising the steps:
   a. providing a solution comprising at least one environmentally acceptable chemical capable of being effectively bound to soil to form a sorbent matrix by reaction in the subsurface;
   b. injecting the solution into the subsurface in a quantity that amounts to a liquid volume having a sufficient concentration capable of effectively removing the contaminants present in at least one pore volume of the soil and included water volume to be treated, wherein the chemical in the solution reacts with the calcium present in the subsurface soil and/or subsurface water to form the sorbent matrix;
      wherein the molecular bonds of the matrix form cages larger than the contaminants to be removed.

34. The method of claim 33 wherein the solution further comprises at least one additive to enhance the sorption of contaminants.

35. The method of claim 33 wherein the solution further comprises at least one additive to enhance microbial activity.

36. The method of claim 34 wherein the additive is selected from the group consisting of sorbitol esters, sorbitan esters, glycerol monoesters, and sulfhydryl amino acids.

37. The method of claim 35 wherein the additive is selected from the group consisting of peroxides, nitrates, lactic acid, and salts thereof.

38. The method of claim 33 wherein the solution in step a) comprises 3.0% carrageenan.

39. The method of claim 38 wherein the carrageenan is of the iota form.

40. The method of claim 33 wherein the solution in step a) comprises 3.0% gelatin.

41. The method of claim 33 wherein the solution in step a) comprises 3.0% succinic acid.

42. The method of claim 33 wherein the solution in step a) comprises 3.0% adipic acid.

43. The method of claim 33 wherein the solution in step a) comprises 3.0% sucrose disuccinate.

44. The method of claim 33 wherein the solution in step a) further comprises 0.005% ferrous sulfate.

45. The method of claim 33, wherein the contaminants are captured within the cages for a sufficient time to allow bioremediation of the contaminants to occur.

46. A method of capturing contaminants from subsurface soil or water in an aquifer, said method comprising the steps:
- a. providing a first solution comprising at least one environmentally acceptable chemical capable of being effectively bound to soil to form a sorbent matrix by reaction in the subsurface;
- b. providing a second solution comprising at least one environmentally acceptable chemical capable of reacting with one or more chemicals in the first solution to create the matrix;
- c. mixing the first solution with the second solution in a quantity that amounts to a liquid volume having a sufficient concentration capable of effectively removing the contaminants present in at least one pore volume of the soil and included water volume to be treated; and
- d. injecting such composition into the subsurface such that the chemicals in the first and second solutions react on a time scale to allow the chemicals in the first solution to coat and bind to the soil;
  - wherein the molecular bonds of the matrix form cages larger than the contaminants to be removed.

47. The method of claim 46 wherein the cage size is at least double in volume of the contaminants to be adsorbed.

48. The method of claim 46 wherein the cage has linear dimensions at least 25% greater than the contaminants to be adsorbed.

49. The method of claim 46 wherein the cage size is at least 307 $Å^3$.

50. The method of claim 46 wherein the cage has linear dimensions of at least 10 Å.

51. The method of claim 49 wherein the cage size is between approximately 307 $Å^3$ and approximately 955 $Å^3$.

52. The method of claim 50 wherein the cage has linear dimensions between approximately 10 Å and approximately 16 Å.

53. The method of claim 51 wherein the cage size is 730 $Å^3$.

54. The method of claim 52 wherein the cage has linear dimensions of 12 Å.

55. The method of claim 46, wherein the contaminants are captured within the cages for a sufficient time to allow bioremediation of the contaminants to occur.

* * * * *